(12) United States Patent
Seki

(10) Patent No.: US 11,119,336 B2
(45) Date of Patent: Sep. 14, 2021

(54) BIFOCAL GLASSES-SHAPED FRAME

(71) Applicant: Norio Seki, Shizuoka (JP)

(72) Inventor: Norio Seki, Shizuoka (JP)

( * ) Notice: Subject to any disclaimer, the term of this patent is extended or adjusted under 35 U.S.C. 154(b) by 191 days.

(21) Appl. No.: 16/331,027

(22) PCT Filed: Sep. 7, 2017

(86) PCT No.: PCT/JP2017/032331
§ 371 (c)(1),
(2) Date: Mar. 6, 2019

(87) PCT Pub. No.: WO2018/047912
PCT Pub. Date: Mar. 15, 2018

(65) Prior Publication Data
US 2019/0235270 A1   Aug. 1, 2019

(30) Foreign Application Priority Data

Sep. 7, 2016 (JP) .............................. JP2016-174428
Oct. 28, 2016 (JP) .............................. JP2016-211264
Jul. 3, 2017 (JP) .............................. JP2017-130151

(51) Int. Cl.
*G02C 5/04* (2006.01)
*G02C 5/20* (2006.01)
(Continued)

(52) U.S. Cl.
CPC ................. *G02C 5/04* (2013.01); *G02C 5/12* (2013.01); *G02C 5/124* (2013.01); *G02C 5/20* (2013.01); *G02C 7/06* (2013.01)

(58) Field of Classification Search
CPC . G02C 5/04; G02C 5/12; G02C 5/124; G02C 5/20; G02C 7/06; G02C 2200/20;
(Continued)

(56) References Cited

U.S. PATENT DOCUMENTS

| 2,622,477 A | 12/1952 | Bechtel |
| 2004/0145699 A1 | 7/2004 | Wu |
| 2018/0217398 A1* | 8/2018 | Park .......................... G02C 5/20 |

FOREIGN PATENT DOCUMENTS

| CN | 201054047 Y | 4/2008 |
| CN | 204595362 U | 8/2015 |

(Continued)

OTHER PUBLICATIONS

Chinese Office Action for Patent Application No. CN 201780055008.X, dated Mar. 3, 2020 (8 pages).
(Continued)

*Primary Examiner* — Tuyen Tra
(74) *Attorney, Agent, or Firm* — Harness, Dickey & Pierce, P.L.C.

(57) ABSTRACT

A frame includes: a pair of lens-holding frames each holding lenses that are vertically arranged; a bridge coupling the pair of lens-holding frames; a temple attached to an outer periphery of each of the lens-holding frames; nose pads being brought into contact with a nose for support; a vertical movement unit configured to vertically move the lens-holding frames along a front bent portion of the temple; and a nose pad elevation unit provided to the bridge, the nose pad elevation unit being configured to vertically slide the nose pads. The bent portion is configured to align a center of the lens with an eye level.

12 Claims, 29 Drawing Sheets

(51) Int. Cl.
*G02C 7/06* (2006.01)
*G02C 5/12* (2006.01)

(58) Field of Classification Search
CPC . G02C 2200/06; G02C 2200/22; G02C 5/146
See application file for complete search history.

(56) References Cited

FOREIGN PATENT DOCUMENTS

| | | |
|---|---|---|
| DE | 3515741 A1 | 9/1985 |
| EP | 0 116 093 A1 | 8/1984 |
| EP | 0 971 255 A2 | 1/2000 |
| JP | S51-126148 U | 10/1976 |
| JP | S58-093029 A | 6/1983 |
| JP | H07-199126 A | 8/1995 |
| JP | 2000-122009 A | 4/2000 |
| JP | 3134235 U | 8/2007 |
| JP | 2008-286884 A | 11/2008 |
| WO | 2010-067877 A1 | 6/2010 |

OTHER PUBLICATIONS

Extended European Search Report for Application No. EP 17848850 dated Jun. 9, 2020 (7 pages).

\* cited by examiner

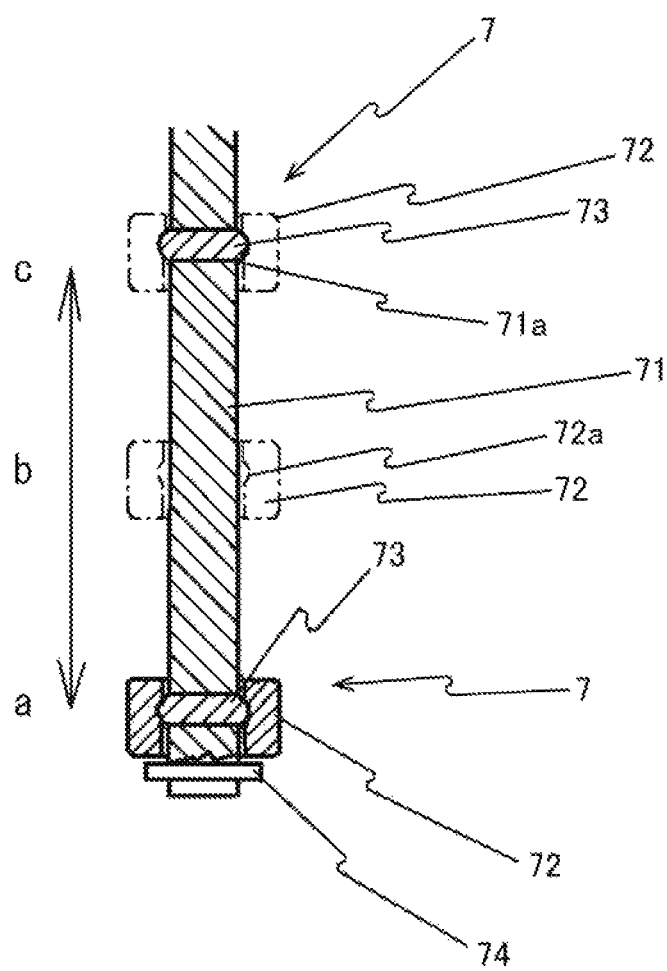

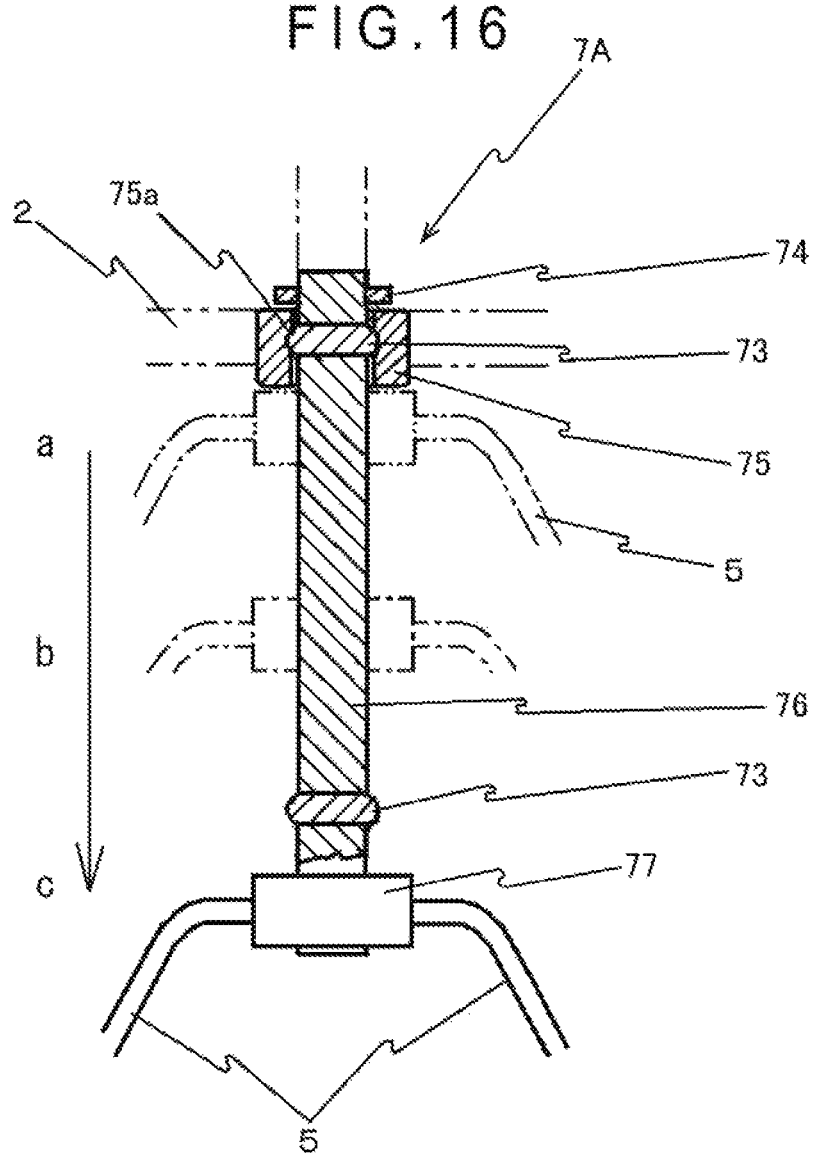

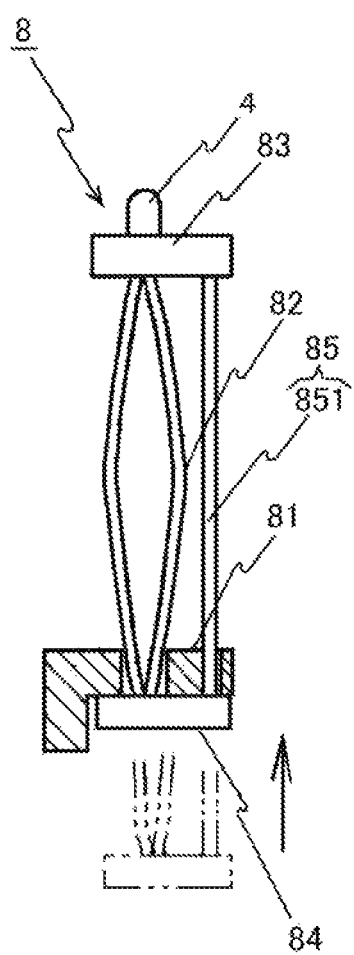

BIFOCAL GLASSES-SHAPED FRAME

The entire disclosures of Japanese Patent Application Nos. 2017-130151, filed on Jul. 3, 2017, 2016-211264, filed on Oct. 28, 2016, and 2016-174428, filed on Sep. 7, 2016 are expressly incorporated by reference herein.

BACKGROUND

Technical Field

The present invention relates to a bifocal-glasses frame that allows for switching different types of lenses through vertical movement depending on intended use.

Background Art

In a typical pair of bifocal glasses, an upper side of each lens is used for a long-distance vision and a lower side of each lens is used for a short-distance vision. A user wearing the typical glasses changes an eye direction or a view angle; specifically, the user looks upward at a distant object, whereas the user looks downward at a nearby object. With such glasses, the user looks at the object with eyes directed downward from a horizontal level as shown in FIG. 26A. In particular, the user is forced to look at a nearby object in an unnatural eye direction, although it is natural for the user to look squarely (horizontally) at the object (i.e., the user looks at the object with an eye level of the user being aligned with the center of each lens). Such an unnatural manner of looking would tire the user, frequently causing eyestrain.

In order to solve this problem, there have been made many proposals for setting the lower portion of each lens, which is intended for the short-distance vision, closer to the eye level to allow the user to look at the object in an eye direction similar to a normal-vision direction (horizontal direction). According to some of these proposals, only the nose pads are vertically moved so that the user looks at an object downward from the horizontal level as shown in FIG. 26B. The user can thus look at the object at a level closer to the eye level with the direction of the eyes being less downward than that in FIG. 26A. However, since the entire lenses are tilted as shown in the figures, the user looks at the object with difficulty, often suffering from eyestrain.

In addition, a variety of glasses have also been proposed that include invertible glasses and glasses with nose pads whose levels can be adjusted so that the level of the glasses is adjusted closer to the eye level. Among the above, the invertible glasses are exemplified by glasses disclosed in JP 7-199126 A, which can be worn in an inverted manner by inverting the temple to vertically move the ear pieces and vertically displacing the nose pads to allow the eyes to be present near the center of a portion for a long-middle-distance or short-distance vision.

However, since an attachment portion of each temple of the invertible glasses is provided on an outer periphery of a frame of the glasses at the middle of the level of the frame, the eye direction is aligned with a border between the upper and lower lenses when the glasses are inverted, causing a difficulty in looking at the object. The level of the nose pads thus always needs to be adjusted. After the glasses of the above type are inverted in use, the nose pads need to be vertically moved for level adjustment, which would cause the use trouble. In addition, it is not easy to vertically move the nose pads for fine adjustment. The eye direction in the inverted state is as shown in FIG. 26C, where the eye level is not aligned with the lens center while the lenses are tilted as a whole. Thus, these glasses cannot eliminate eyestrain.

An object of the invention is to provide a bifocal-glasses frame that allows for easily switching a variety of types of lenses depending on intended use through vertical movement and aligning a center of each lens with an eye level to reduce eyestrain.

SUMMARY

According to an aspect of the invention, a bifocal-glasses frame includes: a pair of lens-holding frames each holding lenses that are vertically arranged; a bridge coupling the pair of lens-holding frames; a temple; nose pads being brought into contact with a nose for support; a vertical movement unit configured to vertically move the lens-holding frames; and a nose pad elevation unit configured to vertically move the nose pads.

According to another aspect of the invention, a bifocal-glasses frame includes: a pair of lens-holding frames each holding lenses that are vertically arranged; a bridge coupling the pair of lens-holding frames; a temple attached to an outer periphery of each of the lens-holding frames; nose pads being brought into contact with a nose for support; a vertical movement unit configured to vertically move the lens-holding frames along a front bent portion of the temple; and a nose pad elevation unit provided to the bridge, the nose pad elevation unit being configured to vertically slide the nose pads. The bent portion may be configured to align the center of either one of the lenses that are vertically arranged with the eye level and the vertical movement unit may include a bearing receiving a vertical portion of the temple while being fixed to a front end of the temple; an elastic member attached inside the bearing; and a stop ring attached to the vertical portion of the temple. Further, the nose pad elevation unit may include; a hanging shaft hanging on a center of the bridge; a slide bearing through which the hanging shaft penetrates; an elastic member attached inside the slide bearing; and a stop ring attached to an end of the hanging shaft.

Herein, "the bent portion configured to align the center of the lens with the eye level" refers to a bent portion provided to the temple and configured to align the center of a lens A or B in use with the eye level of the user as shown in FIGS. 10A and 10B. Moreover, "height substantially at the center" refers to a height at or near the center.

In the above aspects, the bifocal-glasses frame includes: a pair of lens-holding frames each holding lenses that are vertically arranged; a bridge coupling the pair of lens-holding frames; a temple; nose pads being brought into contact with a nose for support; a vertical movement unit provided to a front bent portion of the temple and configured to vertically move each of the lens-holding frames along the bent portion; and a nose pad elevation unit provided to the bridge and configured to vertically slide the nose pads. The above arrangement allows for easily switching different types of lenses depending on intended use through vertical movement and aligning the center of the lens with the eye level to reduce eyestrain. In particular, the bifocal-glasses frame with the above arrangement allows the lenses of a first pair of glasses and the lenses of a second pair of glasses, which are vertically arranged, to be used substantially in the same manner as a pair of glasses whose top sides are fixed to each other. Thus, the user can selectively use the first pair of glasses and the second pair of glasses depending on intended use substantially as if they were separate pairs of glasses. Moreover, the above arrangement allows for the vertical movement without causing the eye level to be misaligned with the center of the lens, providing a very clear vision.

The temple is provided with the bent portion for aligning the center of either one of the lenses that are vertically arranged with the eye level. This allows for promptly and reliably switching one of the lenses to the other one in a simple manner and, further, increasing a usable range of each lens (i.e., a range where the user can move his/her eyes to see). Moreover, the user can look straight at the object in a natural state for eyes, so that eyestrain is reducible.

Further, unlike a conventional product, the bifocal-glasses frame of the above aspects almost eliminates the necessity of adjustment or fine adjustment, so that the bifocal-glasses frame is very user-friendly.

The vertical movement unit includes: the bearing that receives the vertical portion of the temple while being fixed to the front end of the temple; the elastic member attached inside the bearing; and the stop ring attached to the vertical portion of the temple. Such a simple arrangement can achieve a smooth vertical movement.

The nose pad elevation unit includes: the hanging shaft hanging on the center of the bridge; the slide bearing where the hanging shaft penetrates; the elastic member attached inside the slide bearing; and the stop ring attached to the end of the hanging shaft. Such a simple arrangement can achieve a smooth vertical movement.

According to still another aspect of the invention, a bifocal-glasses frame includes: a pair of lens-holding frames each holding lenses that are vertically arranged; a bridge coupling the pair of lens-holding frames; a temple; nose pads being brought into contact with a nose for support; a nose pad elevation unit provided to the bridge and configured to vertically slide the nose pads; and a vertical movement unit provided to an outer periphery of each of the lens-holding frames while being connected to a front end of the temple to vertically move each of the lens-holding frames. The vertical movement unit includes: a fixation plate fixed to the outer periphery of each of the lens-holding frames; a pair of flat springs that penetrate through the fixation plate so that the fixation plate is vertically movable; a movable plate located above the fixation plate and fixed to respective first ends of the flat springs; and an antidrop member fixed to respective second ends of the flat springs. The movable plate is connected to the front end of the temple. A displacement of the nose pad elevation unit and the vertical movement unit preferably corresponds to a distance between respective centers of the lenses that are vertically arranged. The nose pad elevation unit may include: a shaft hanging on a center of the bridge; a bearing through which the shaft penetrates; an elastic member attached to the shaft; and a stop ring attached to an end of the shaft. Alternatively, the bearing of the nose pad elevation unit may be fixed to the center of the bearing while the shaft penetrates through the bearing to be slidable. The vertical movement unit may be provided with a guide mechanism for vertical movement.

In the above aspect, the bifocal-glasses frame includes at least: a pair of lens-holding frames each holding lenses that are vertically arranged; a bridge coupling the pair of lens-holding frames; a temple hinged at a front end thereof; nose pads being brought into contact with a nose for support; a vertical slide provided to the bridge and configured to vertically slide the nose pads; and a vertical movement unit provided to an outer periphery of each of the lens-holding frames while connected to a front end of the temple to vertically move each of the lens-holding frames. The above arrangement allows for easily switching different types of lenses depending on intended use through the vertical movement of the lens-holding frames. Further, unlike a conventional product, the above arrangement almost eliminates the necessity of fine adjustment and thus the bifocal-glasses frame is very user-friendly. In particular, since the center of the lens is aligned with the eye level of the user, eyestrain can be reduced. Further, since the vertical movement unit is provided to the outer periphery of each of the lens-holding frames, the design of the lens-holding frames, which would be similar to conventional ones, can be simplified. Further, the vertical movement unit includes at least: a fixation plate fixed to the outer periphery of each of the lens-holding frame; a pair of flat springs that penetrate through the fixation plate so that the fixation plate is vertically movable; a movable plate located above the fixation plate and fixed to respective first ends of the flat springs; and an antidrop member fixed to respective second ends of the flat springs, and the movable plate is connected to the front end of the temple. Such a simple arrangement, where the front end of the temple is connected to the movable plate, can achieve a smooth vertical movement of the lens-holding frame.

A displacement of the vertical slide and the vertical movement unit corresponds to a distance between respective centers of the lenses that are vertically arranged. This allows the center of the lens in use to be aligned with the eye level of the user, so that two different pairs of glasses (lenses) can be used substantially in the same manner as a pair of glasses whose top sides are fixed to each other. Thus, the user can selectively use the first pair of glasses and the second pair of glasses depending on intended use substantially as if they were separate pairs of glasses, providing a very clear vision. Further, the above arrangement allows for promptly and reliably switching one of the lenses to the other one in a simple manner and increasing a usable range of each lens (i.e., a range where the user can move his/her eyes to see). Moreover, the user can look straight at the object in a natural state for eyes, so that eyestrain is reducible.

The vertical slide includes: a shaft hanging on a center of the bridge; a bearing through which the shaft penetrates; an elastic member attached to the shaft; and a stop ring attached to an end of the shaft. Such a simple arrangement can achieve a smooth vertical movement of the nose pads.

The vertical slide includes: a bearing fixed to a center of the bridge; a shaft that penetrates through the bearing to be slidable; an elastic member attached to the shaft; and a stop ring attached to an end of the shaft. This arrangement can achieve the above effects.

The vertical movement unit is provided with a guide mechanism for vertical movement, allowing a smooth vertical movement of the movable plate.

According to yet another aspect of the invention, a bifocal-glasses frame includes: a pair of lens-holding frames each holding lenses that are vertically arranged; a bridge coupling the pair of lens-holding frames; a temple; nose pads being brought into contact with a nose for support; a vertical movement unit configured to vertically move the lens-holding frames; and a nose pad elevation unit configured to vertically move the nose pads. The vertical movement unit includes: a bearing fixed to a front end of the temple; an operation arm having a first end that is pivotally connected to the bearing via a shaft; an attachment shaft configured to pivotally connect a second end of the operation arm to an outer periphery of each of the lens-holding frames; and a position retainer configured to retain the operation arm at a predetermined position. The position retainer may include a protrusion provided to the bearing;

and a cut provided to an edge of the operation arm and engageable with the protrusion. In addition, the nose pad elevation unit may include: a hanging shaft hanging on a center of the bridge; a bearing receiving the hanging shaft to be vertically movable; an elastic member attached inside the bearing; and a stop ring attached to an end of the hanging shaft.

The bifocal-glasses frame of the above aspect includes at least: a pair of lens-holding frames each holding lenses that are vertically arranged; a bridge coupling the pair of lens-holding frames; a hinged temple; nose pads being brought into contact with a nose for support; a vertical movement unit configured to vertically move the lens-holding frames; and a nose pad elevation unit configured to vertically move the nose pads, and the vertical movement unit includes at least: a bearing fixed to a front end of the temple; an operation arm having a first end that is pivotally connected to the bearing via a shaft; an attachment shaft configured to pivotally connect a second end of the operation arm to an outer periphery of each of the lens-holding frames; and a position retainer configured to retain the operation arm at a predetermined position. The above arrangement allows each of the lens-holding frames to be vertically moved via the operation arm so that, for instance, different types of lenses can be easily selectively used depending on intended use. Further, the above arrangement allows the center of the lens in use with the eye level to reduce eyestrain. In particular, the bifocal-glasses frame with the above arrangement allows the lenses of a first pair of glasses and the lenses of a second pair of glasses, which are vertically arranged, to be used substantially in the same manner as a pair of glasses whose top sides are fixed to each other. Thus, the user can selectively use the first pair of glasses and the second pair of glasses depending on intended use substantially as if they were separate pairs of glasses. Moreover, the above arrangement allows for the vertical movement without causing the eye level to be misaligned with the center of the lens, providing a very clear vision. Thus, the bifocal-glasses frame allows two types of lenses to be easily individually used without changing the glasses.

The position retainer includes a protrusion provided to the bearing; and a cut provided to an edge of the operation arm and engageable with the protrusion. This arrangement allows the eye level to be aligned with the center of the either one of the lenses. This enables promptly and reliably switching one of the lenses to the other one in a simple manner and increasing a usable range of each lens (i.e., a range where the user can move his/her eyes to see). Moreover, the user can look straight at the object in a natural state for eyes, so that eyestrain is reducible.

The nose pad elevation unit includes: a hanging shaft hanging on a center of the bridge; a bearing receiving the hanging shaft to be vertically movable; an elastic member attached inside the bearing; and a stop ring attached to an end of the hanging shaft. Such a simple arrangement can achieve a smooth vertical movement of the nose pads.

BRIEF DESCRIPTION OF DRAWINGS

FIG. 15 illustrates an operation of the vertical slide.
FIG. 16 illustrates an operation of another vertical slide.
FIG. 19C illustrates the operation of the vertical movement unit and the guide mechanism.

DETAILED DESCRIPTION

Figure 1:
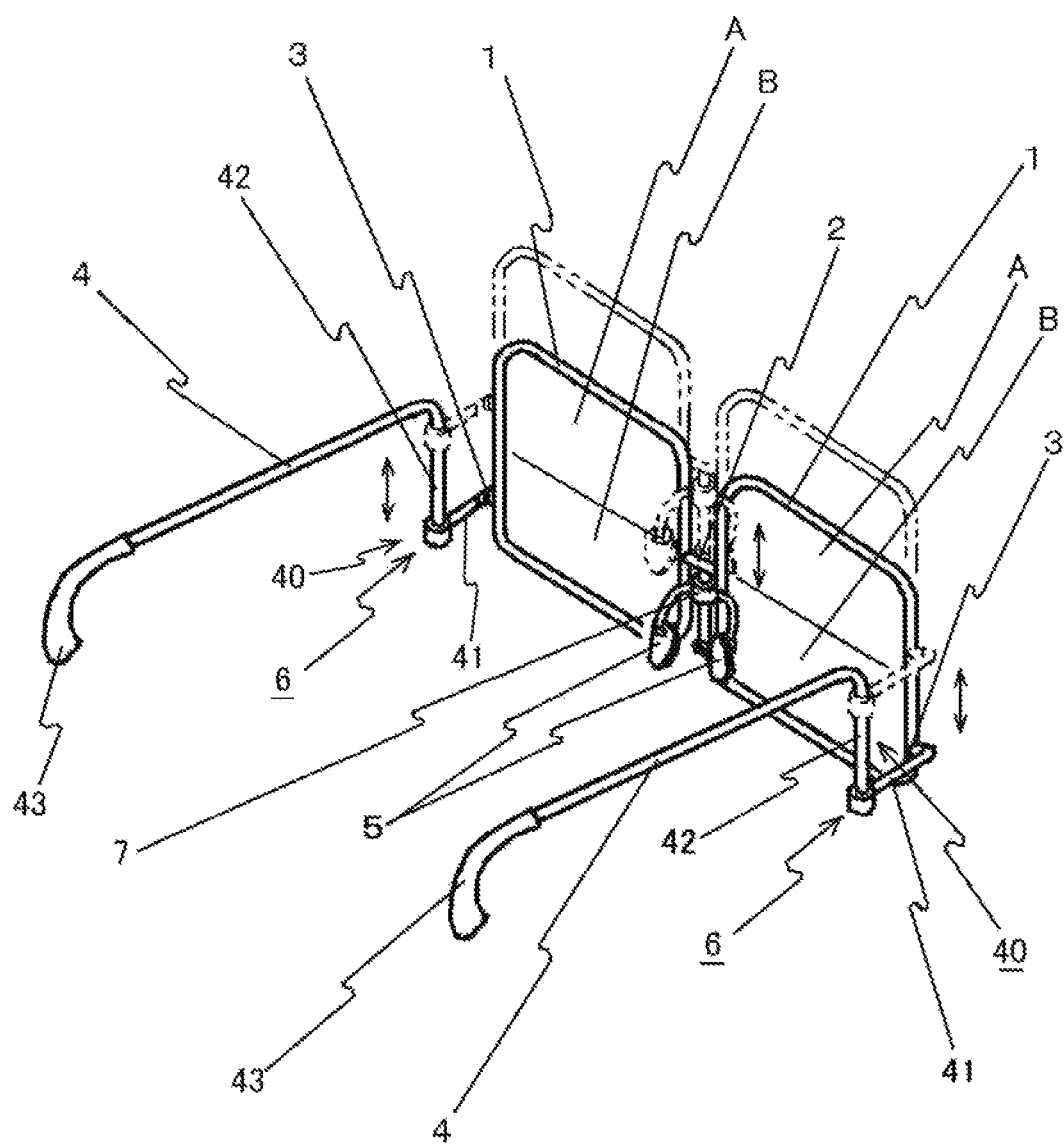
FIG. 1 illustrates a first exemplary embodiment of the invention.

Exemplary embodiments of the invention will be described below with reference to the attached drawings.

The same reference characters refer to the same parts described in first, second and subsequent exemplary embodiments and any repetitive detailed description thereof are omitted or simplified.

First Exemplary Embodiment

Figure 2:
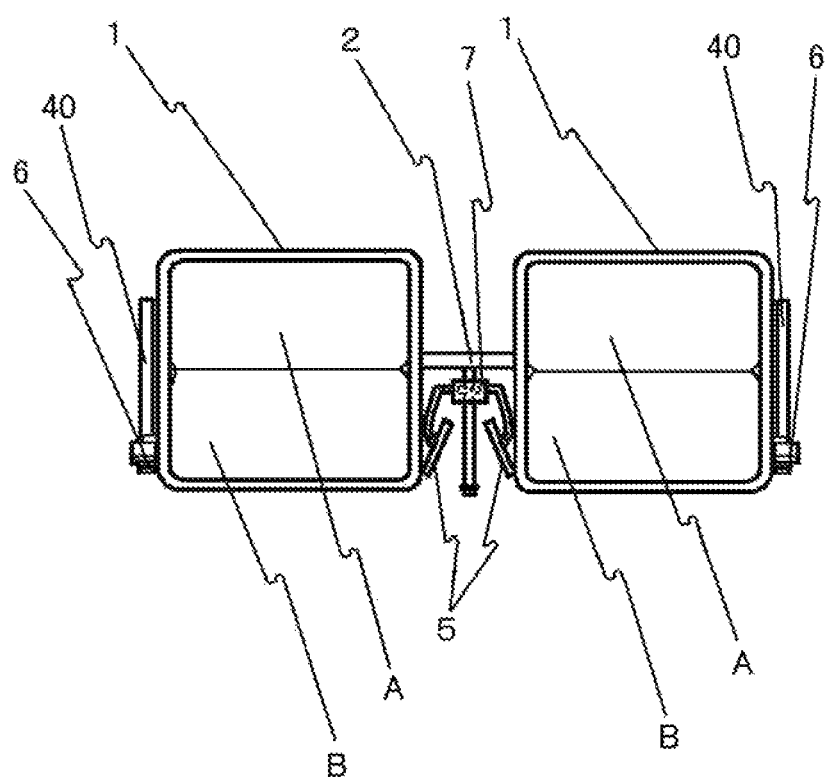
FIG. 2 is a front view of the first exemplary embodiment shown in FIG. 1.
Figure 3:
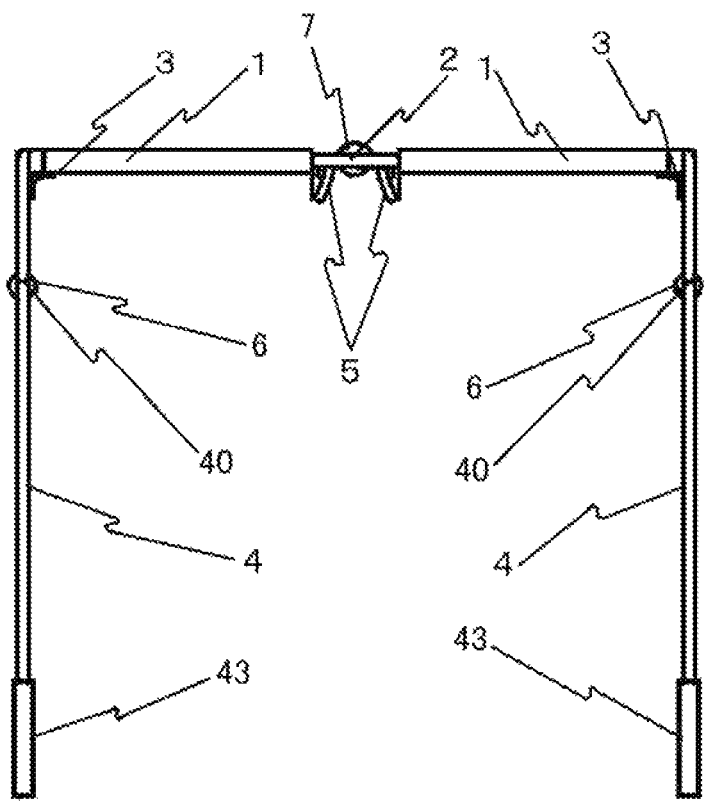
FIG. 3 is a plan view of the first exemplary embodiment shown in FIG. 1.

A first exemplary embodiment of the invention will be described with reference to FIGS. 1 to 3.

A pair of lens-holding frames 1 each hold a lens A and a lens B that are vertically arranged. The lens-holding frames 1 each surround the lenses A and B as shown in the figures but the invention is not limited thereto. For instance, the lens-holding frames 1 may be in the form of a frame for frameless glasses. Preferable examples of the lenses held by the lens-holding frames 1 include a concave lens, convex lens, plate glass (e.g., a transparent glass and a polarization plate), colored glass (e.g., sunglasses), and wearable terminal glass. The lens may be circular, oval or in any shape, although the lens shown in FIGS. 1 and 2 is rectangular. The lenses A and B are not necessarily separate lenses but may be integrated into a single lens. Further, the lenses A, B may be replaced by a display for a wearable terminal.

Figure 9:
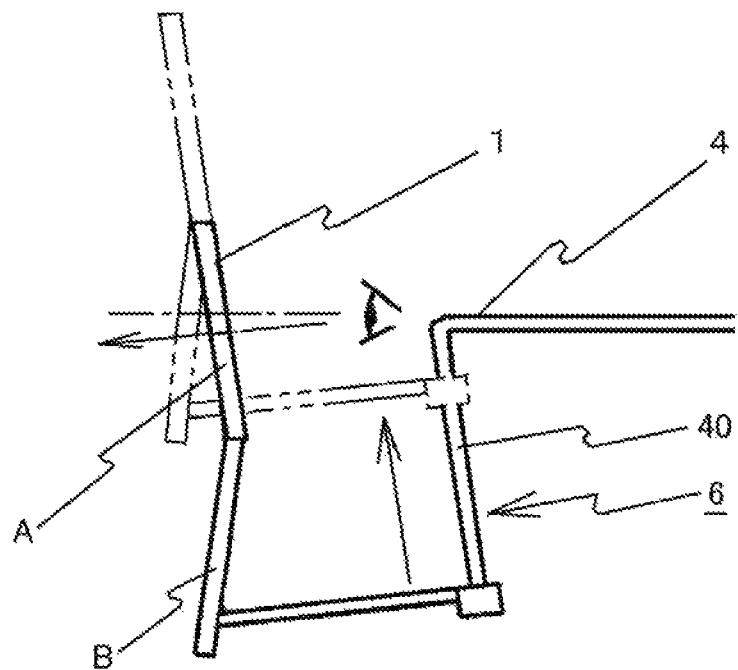
FIG. 9 illustrates a bent lens-holding frame.

Moreover, the lens-holding frames 1 may be bent (inclined) as shown in FIG. 9 such that the lenses A and B are inclined. For the above arrangement, a later-described bent portion 40 may be inclined to be translatable in accordance with the inclination of an upper portion of the lens-holding frames 1 or, alternatively, may be bent at a right angle with respect to a later-described temple 4 as shown in other figures. A chain line in FIG. 9 shows an eye level.

A bridge 2 is connected to the pair of lens-holding frames 1 at the middle in height. The connection position of the bridge 2 may be different from the middle in height.

A hinge 3 is configured to hinge the later-described temple 4. The hinge 3 is provided on an outer periphery of each of the lens-holding frames 1 at a position below a center of a lower lens while being attached to a front end 41 of the temple 4.

The temple 4 is hinged at the front end thereof. The temple 4 includes a front bent portion 40. The front bent portion 40 includes at least the front end 41 and a vertical portion 42 of the temple 4. The vertical portion 42 is in the shape of a round bar. It should be noted that the front end 41 and the vertical portion 42 are separate components (see FIG. 4). The bent portion 40 is configured to align the center of the lens A or B with an eye level. Although the figures show that the bent portion 40 is bent downward toward the hinge 3, the bent portion 40 may be bent upward toward the hinge 3. For the latter case, the hinge 3 is provided on the outer periphery of each of the lens-holding frames 1 at a level higher than the center of the upper lens. It should be noted that the bent portion 40 may be inclined as shown in FIG. 9 instead of being vertically bent (bent at a right angle). An ear piece 43 is attached to a rear end of the temple 4.

Nose pads 5, which are configured to come into contact with the nose to be supported as a whole, are provided below the bridge 2 and vertically slidable.

A vertical movement unit 6 functions in conjunction with the bent portion 40. The vertical movement unit 6 includes an annular bearing 61 that receives the round-bar-shaped vertical portion 42 of the temple 4 to be vertically movable, an elastic member 62 provided between the bearing 61 and the vertical portion 42, and a stop ring 63 attached to an end of the vertical portion 42 (see FIGS. 4 and 5). The bearing 61 is fixed to the front end 41 of the temple 4 and the elastic member 62 (e.g., an O-ring) is attached in the bearing 61. The stop ring 63, which is in the form of an E-ring, is configured to prevent the bearing 61 from dropping off the vertical portion 42. For instance, a C-ring may be used in place of the E-ring. The vertical portion 42 is provided with two curved-concave grooves 42a configured to receive a projection of the elastic member 62 for positioning. The grooves 42a are spaced from each other at a distance corresponding to a distance between the respective centers of the lens A and the lens B.

Figure 6:
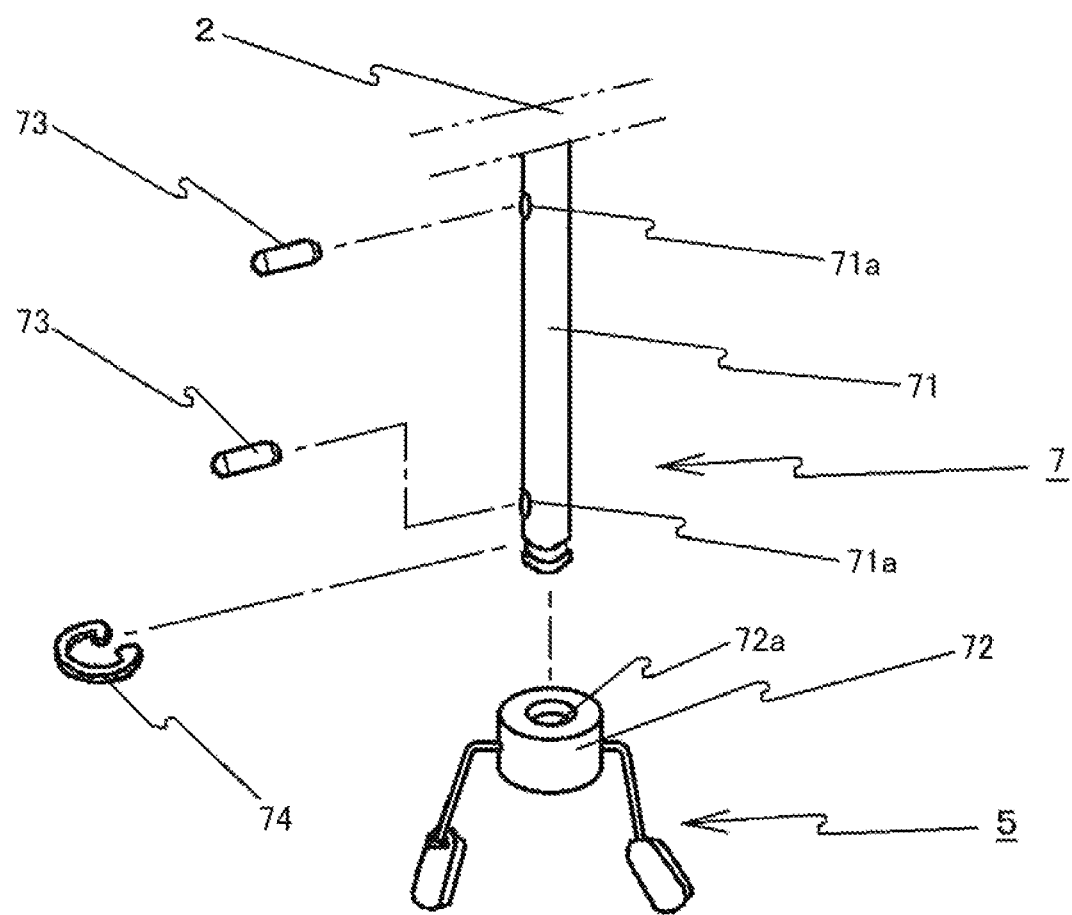
FIG. 6 is an exploded perspective view of parts of a vertical slide.

In some exemplary embodiments, a mechanism of a later-described vertical slide 7 (nose pad elevation unit) is applied to the vertical movement unit 6. Specifically, as compared with the above-described vertical movement unit 6 where the elastic member 62 is attached to the bearing 61, a cylindrical elastic member 73 of rubber or synthetic resin as shown in FIG. 6 is fitted in a through hole pierced through the vertical portion 42 at a position corresponding to each of the curved-concave grooves 42a with both ends of the elastic member 73 projecting from an outer circumferential surface of the vertical portion 42. Simultaneously, a curved-concave groove may be provided to an inner surface of the bearing 61 to receive the projections of the inserted elastic member 73 (see FIG. 7).

Figure 17A:
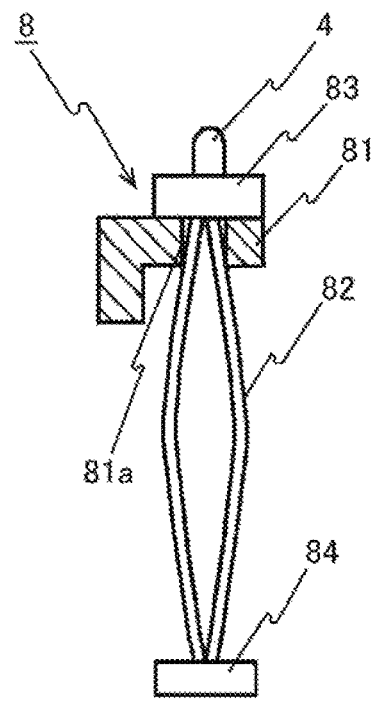
FIG. 17A illustrates an operation of a vertical movement unit.
Figure 17B:
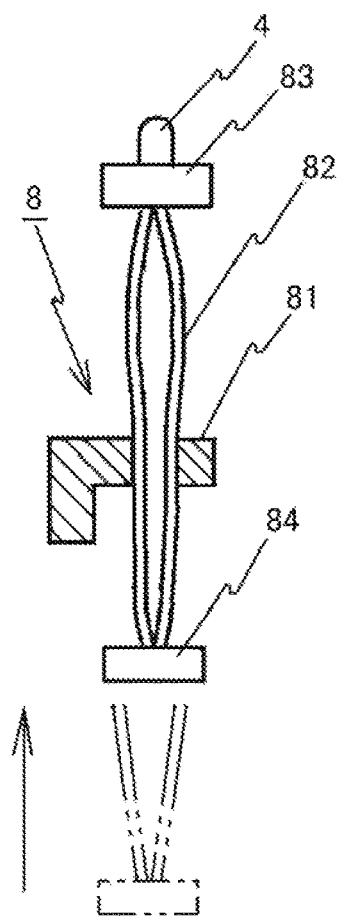
FIG. 17B illustrates the operation of the vertical movement unit.
Figure 17C:
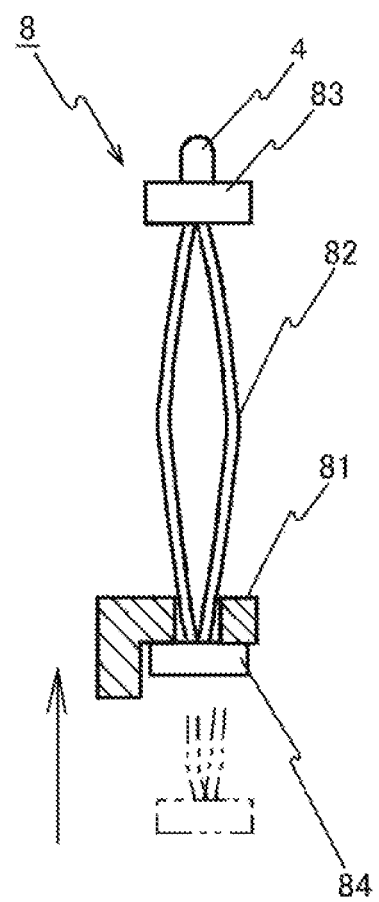
FIG. 17C illustrates the operation of the vertical movement unit.

In some exemplary embodiments, the vertical movement unit 6 includes two flat springs 82 as shown in FIGS. 17A to 17C. An arrangement of the vertical movement unit 6 including the flat springs 82 is not described herein more, since it will be described later in detail.

Figure 4:
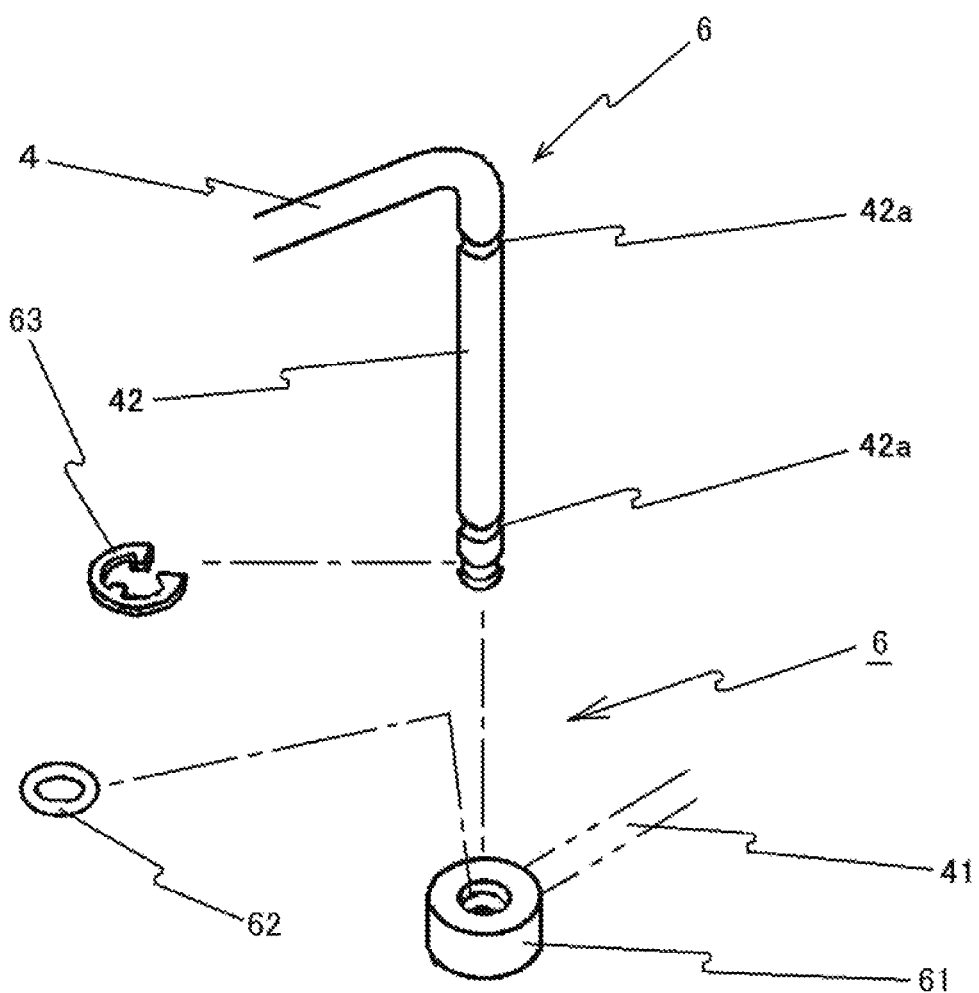
FIG. 4 is an exploded perspective view of parts of a vertical movement unit.
Figure 5:
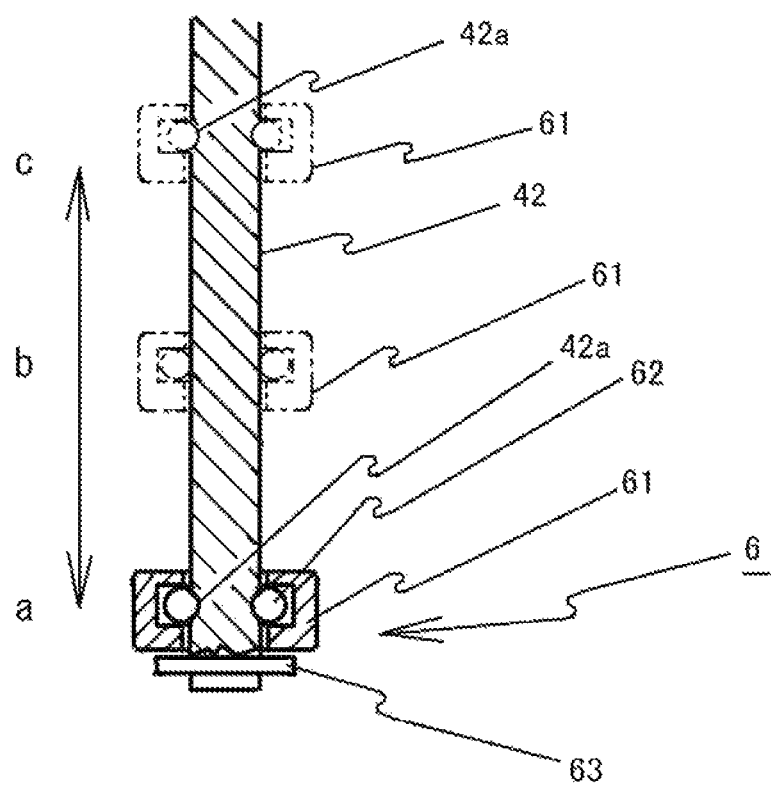
FIG. 5 illustrates an operation of the vertical movement unit.

The vertical slide 7 is provided to vertically slide the nose pads 5 (see FIG. 6). The vertical slide 7 includes a hanging shaft 71 in the form of a round bar that hangs on a center of the bridge 2, a slide bearing 72 (bearing) configured to receive the hanging shaft 71, elastic members 73 attached between the hanging shaft 71 and the slide bearing 72, and a stop ring 74 attached to an end of the hanging shaft 71. Two through holes 71a are pierced through the hanging shaft 71. A distance between the through holes 71a corresponds to a distance between the respective centers of the lens A and the lens B. While the nose pads 5 are fixed to the slide bearing 72, a curved-concave groove 72a is formed inside the slide bearing 72 by cutting where projections of the elastic members 73 are to be fitted. The elastic members 73 are preferably each in the form of, but not limited to, a cylindrical piece of rubber or synthetic resin. For instance, the elastic members 73 may each be in the form of an O-ring, In this case, the hanging shaft 71 may be provided with two curved-concave grooves instead of the through holes 71a while the O-ring is attached inside the slide bearing 72 as shown in FIGS. 4 and 5. The stop ring 74 may be in any other form such as C-ring and E-ring. Alternatively, the stop ring 74 may include the two flat springs 82 as shown in FIGS. 17A to 17C.

Figure 8:
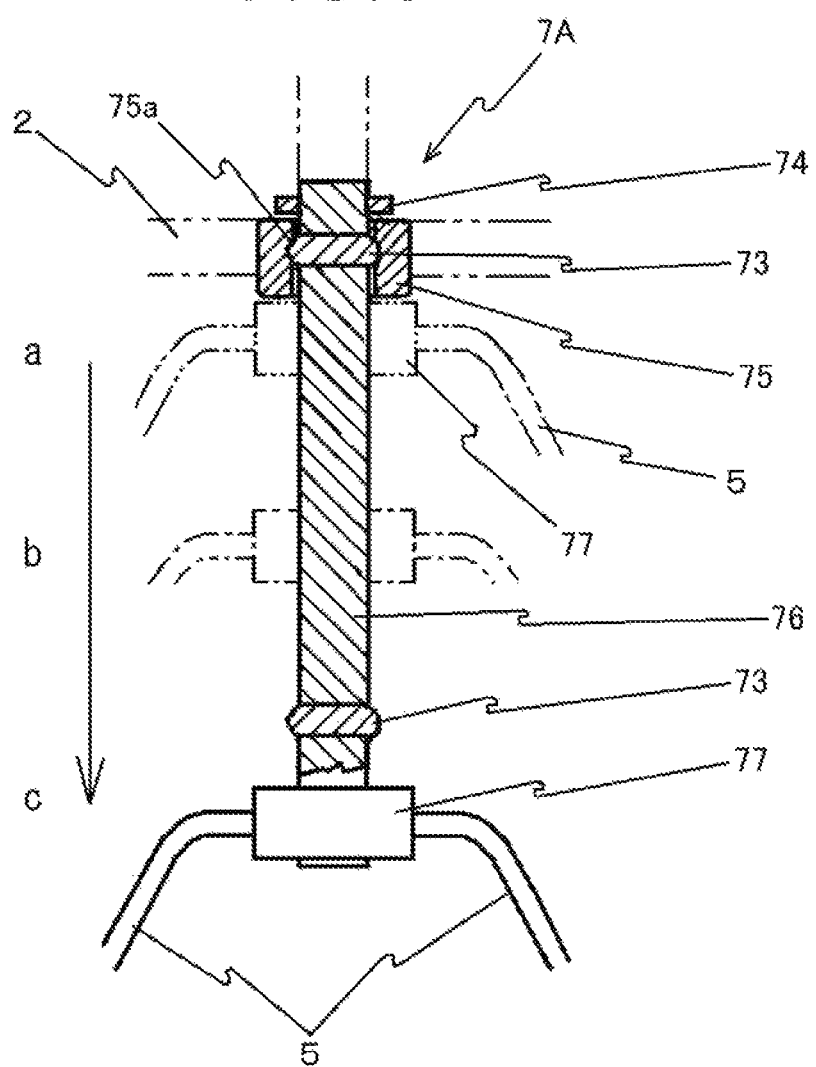
FIG. 8 illustrates an operation of another vertical slide.

In some exemplary embodiments, the nose pad elevation unit is in the form of another vertical slide 7A (see FIG. 8). The vertical slide 7A includes at least an annular bearing 75 fixed to the center of the bridge 2, a slide shaft 76 received in the bearing 75 to be vertically movable, cylindrical elastic members 73 attached between the bearing 75 and the slide shaft 76, the stop ring 74 attached to an upper end of the slide shaft 76, and a cylinder 77 fixed to a lower end of the slide shaft 76. The nose pads 5 are fixed to the cylinder 77. It should be noted that the mechanism of the vertical slide 7 or the vertical slide 7A may be applied to the vertical movement unit 6.

An operation of the vertical movement unit 6 will be described below with reference to FIG. 5. First, the bearing 61 in a state "a" is pushed upward in a direction of an arrow with a finger, thereby disengaging the elastic member 62 in the form of an O-ring from the groove 42a. An inner diameter of the elastic member 62 thus becomes as large as an outer diameter of the vertical portion 42. Simultaneously, the elastic member 62 is forced deeper into the groove of the bearing 61 as in a state "b". As the bearing 61 in this state is further moved upward, the elastic member 62 is fitted into the groove 42a, stopping the bearing 61 at a position "c".

Figure 7:
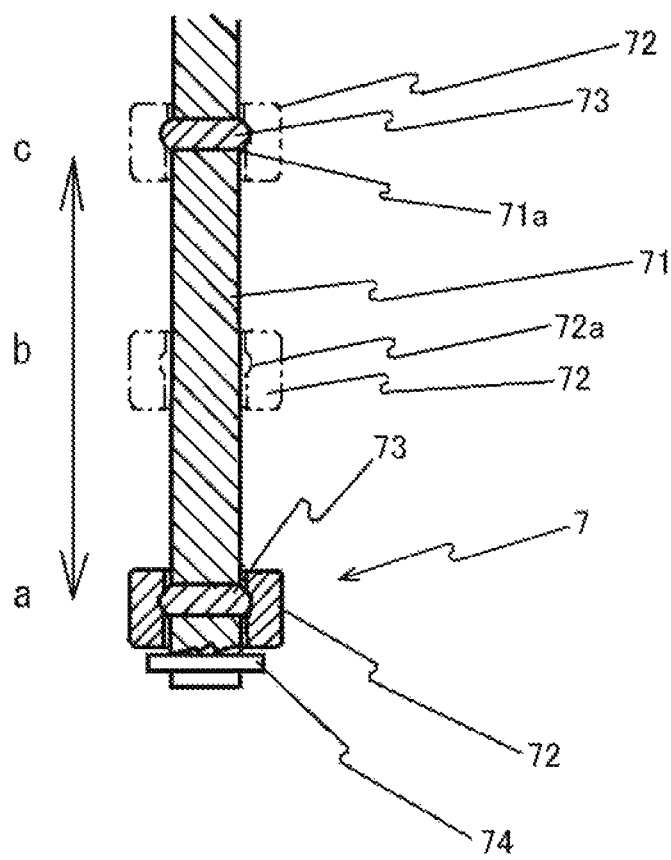
FIG. 7 illustrates an operation of the vertical slide.

An operation of the vertical slide 7 will be described below with reference to FIG. 7. First, the slide bearing 72 in the state "a" is pushed upward in a direction of an arrow with a finger, thereby disengaging the projections of one of the elastic members 73 out of the hanging shaft 71 from the groove 72a of the slide bearing 72. The slide bearing 72 thus becomes smoothly movable with a space being formed between the slide bearing 72 and the hanging shaft 71 as in the state "b". The slide bearing 72 is then moved further upward. The projections of one of the elastic members 73 out of the hanging shaft 71 are then fitted into the groove 72a of the slide bearing 72, thereby stopping the slide bearing 72 at a position "c". The nose pads 5 are thus moved upward from the position "a" to the position "c".

Description will be made with reference to FIG. 8, which illustrates an operation of the vertical slide 7A. First, the cylinder 77 with the nose pads 5 fixed thereto as in a state "a" is pushed downward in a direction of an arrow with a finger, thereby disengaging the lower one of the elastic members 73 on the slide shaft 76 from a groove 75a of the bearing 75. The bearing 75 thus becomes smoothly movable with a space being formed between the slide shaft 76 and the bearing 75. The slide shaft 76 then naturally falls passing through a position "b" until the upper one of the elastic members 73 comes into contact with the bearing 75. By pulling the cylinder 77 with a slight force, the cylinder 77 is moved downward along with the slide shaft 76 to be held at a position "c" with the elastic member 73 being fitted into the groove 75a of the bearing 75. The nose pads 5 are thus moved downward from the position "a" to the position "c".

Figure 10A:
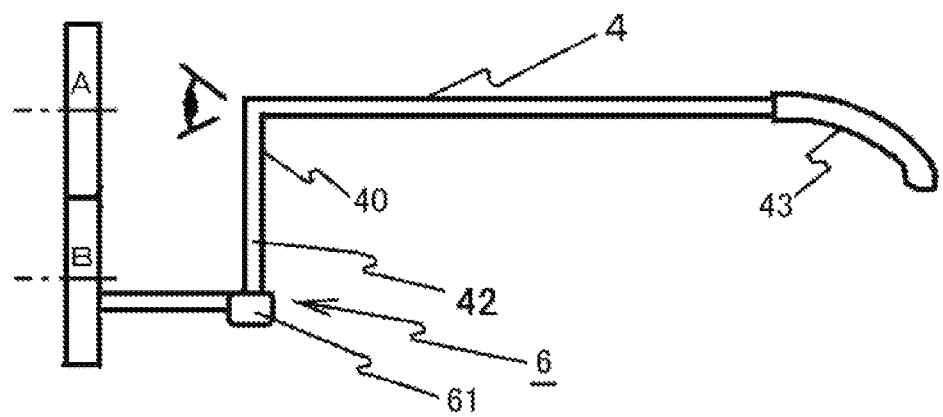
FIG. 10A illustrates an operation according to the first exemplary embodiment.
Figure 10B:
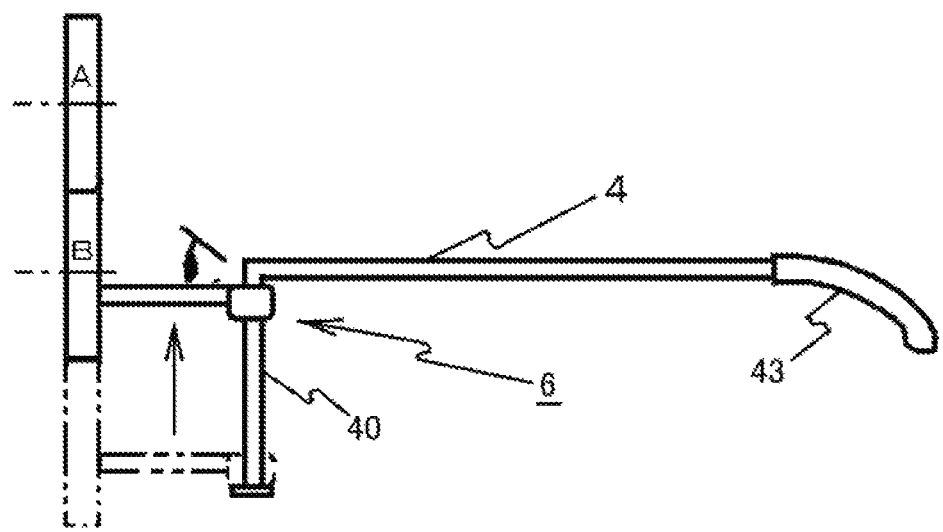
FIG. 10B illustrates the operation according to the first exemplary embodiment.

Operations and advantages in the first exemplary embodiment will be described below with reference to FIGS. 10A and 10B. Firstly, a state shown in FIG. 10A will be described. When the user wears glasses in the state shown in FIG. 10A, the eye level of the user is aligned with the center of the lens A, so that the user can see an object very clearly and upper and lower sides of the lens A are effectively usable. In order to subsequently use the lens B, the bearing 61 is first pushed upward with a finger with the elastic member 62 being disengaged from the groove 42a. As the bearing 61 is moved further upward, the elastic member 62 is fitted into the groove 42a, thereby holding the bearing 61 at a position shown in FIG. 10B (see FIG. 5). The center of the lens B is aligned with the eye level in this state in the same manner as when the lens A is used. The user can thus look straight at the object, so that eyestrain of the user is drastically reducible.

As the bearing 61 is moved upward, the lens-holding frames 1 are pushed upward along with the nose pads 5. Accordingly, the slide bearing 72 is moved downward with a finger. The projections of one of the elastic members 73 out of the hanging shaft 71 are thus disengaged from the groove 72a of the slide bearing 72, so that the slide bearing 72 becomes smoothly movable. The slide bearing 72 is then slid from the position "c" to the position "a" shown in FIG. 7 until the projections of one of the elastic members 73 out of the hanging shaft 71 are fitted into the groove 72a of the slide bearing 72 to hold the slide bearing 72. In other words, the eye level can be shifted from the center of the lens A to the center of the lens B without changing a positional relationship of the nose pads 5, the ear pieces 43, the temple 4, and the bent portion 40 for the use of the lens A.

As described above, while the lens-holding frames 1 are vertically moved, the nose pads 5 are also vertically moved, accordingly. Thus, the eye level can be shifted from the center of the lens A to the center of the lens B without changing the positional relationship of the nose pads 5, the ear pieces 43, the temple 4, and the bent portion 40 for the use of the lens A. Further, when a concave lens is used as the lens A and a convex lens is used as the lens B, the conventional problems can be quickly solved. Specifically, 1) the user can be prevented from suffering a blurring forward vision or an incorrect feeling of distance due to out-of-focus eyes when looking at an object ahead immediately after operating devices, such as a car navigation device and an audio device, around a driver's seat. 2) When the user sitting in front of a computer visually checks data and characters at hand and then looks at the computer screen, the user can be prevented from feeling it difficult to look at small characters and feeling dazzled, resulting in a reduction in eyestrain, headache, stiff shoulder and the like. 3) The user can walk down stairs without a difficulty such as blurring vision around his/her foot sight, so that the user can be prevented from accidentally stepping off the stairs. 4) The user can read a newspaper or a magazine while watching a TV with less frequency of out-of-focus eyes. 5) During fishing in a rocky area, the user can walk around the rocky area with almost no risk of stumbling over a rock even immediately after putting a bait on a hook.

A sunglass may be used as the lens A while a convex lens may be used as the lens B. In this case, immediately after operating, in particular, a car navigation device, an audio device or the like around a driver's seat using the sunglass, the user can change the lens to the sunglass to look ahead so as not to suffer a blurring forward vision or an inaccurate distance-feeling nor feel dazzled. A wearable terminal glass may be used as the lens A while a convex lens may be used as the lens B. In this case, the user who wears the lens B as glasses can use the wearable terminal without taking off the glasses.

Thus, the frame in the first exemplary embodiment allows two types of lenses to be easily individually used without changing the glasses.

Second Exemplary Embodiment

Figure 11:
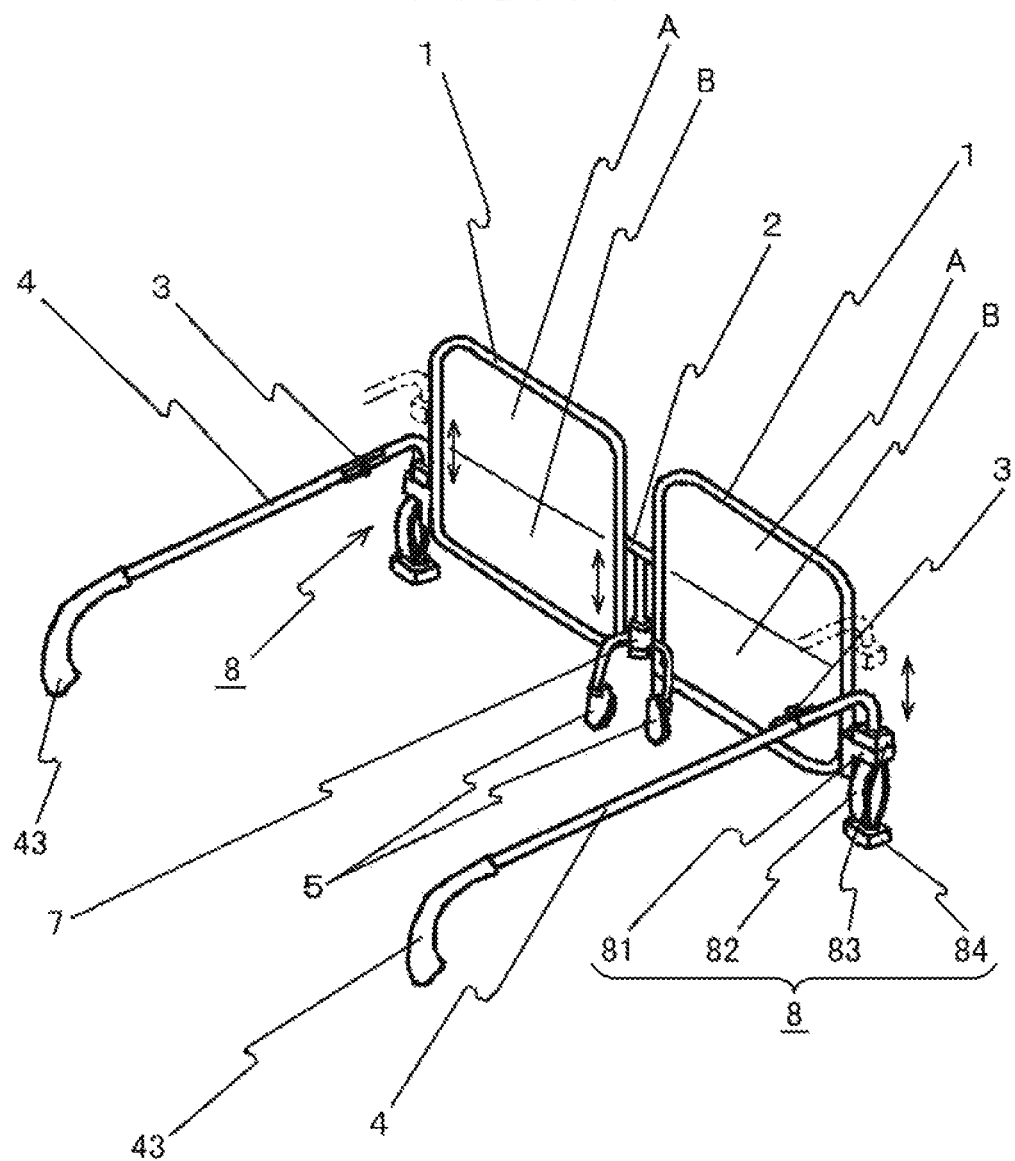
FIG. 11 illustrates a second exemplary embodiment of the invention.
Figure 12:
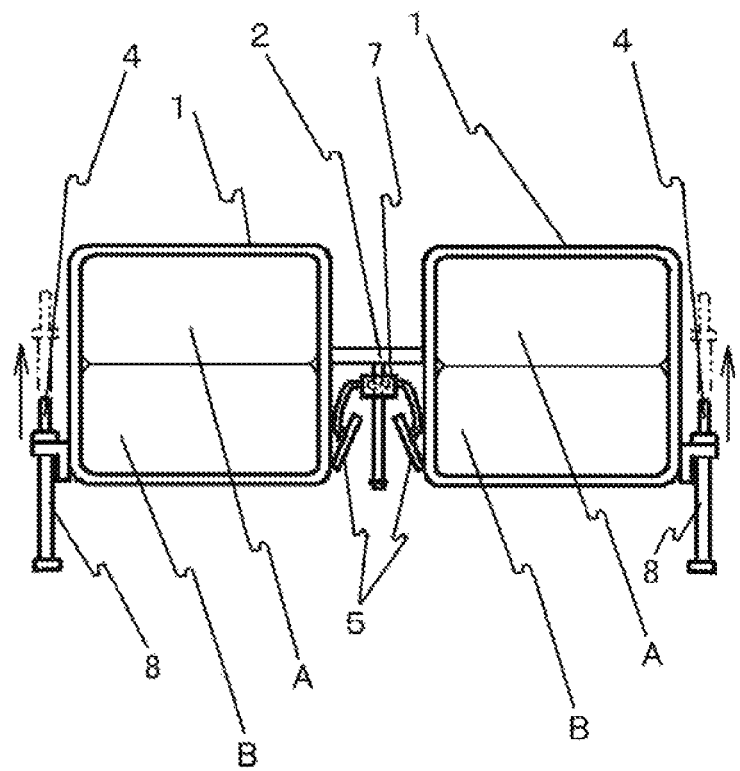
FIG. 12 is a front view of the second exemplary embodiment shown in FIG. 11.
Figure 13:
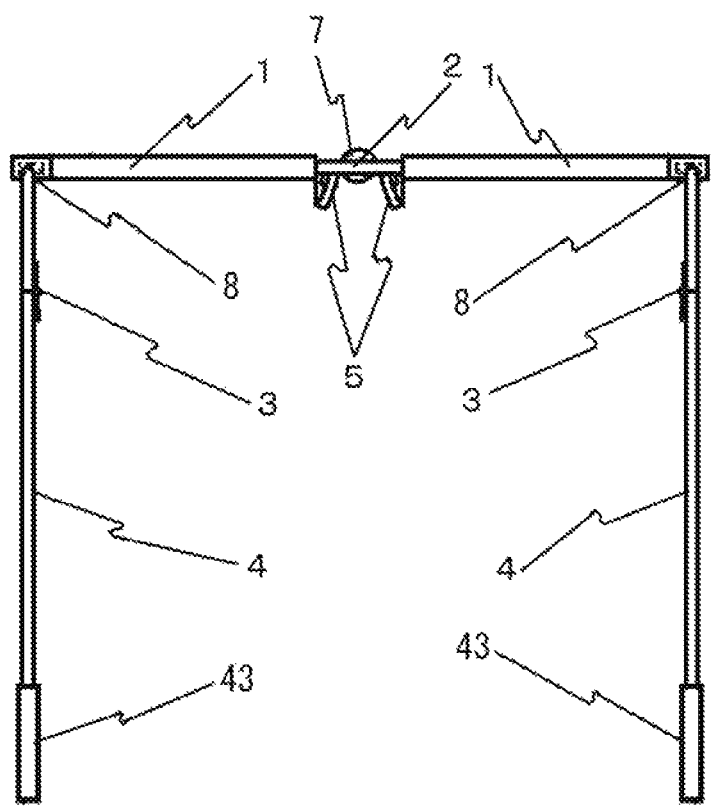
FIG. 13 is a plan view of the second exemplary embodiment shown in FIG. 11.

A second exemplary embodiment will be described with reference to FIGS. 11 to 13.

Figure 14:
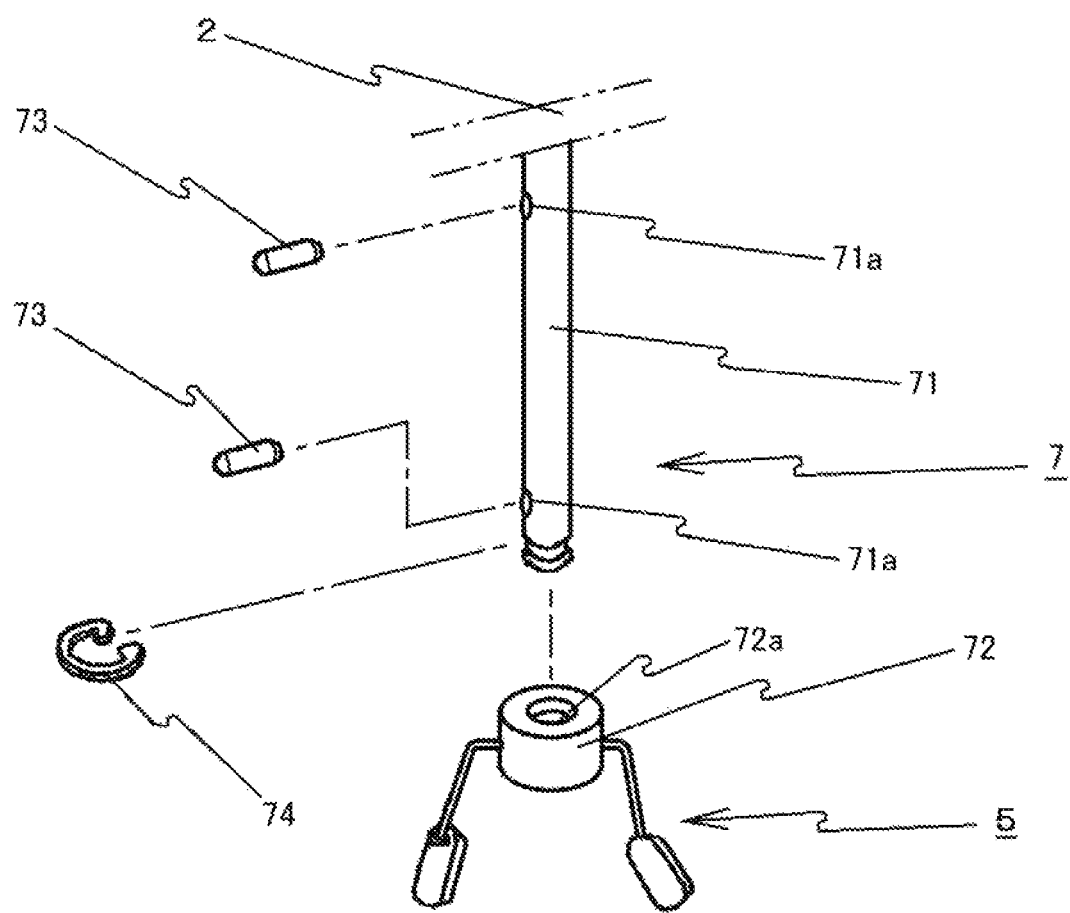
FIG. 14 is an exploded perspective view of parts of a vertical slide.

The vertical slide 7 (nose pad elevation unit) is provided to vertically slide the nose pads 5 (see FIGS. 14 and 15). The vertical slide 7 includes the hanging shaft 71 in the form of a round bar that hangs on the center of the bridge 2, the slide bearing 72 that receives the hanging shaft 71, the elastic members 73 attached to the hanging shaft 71 and projecting from the outer circumferential surface of the hanging shaft 71, and the stop ring 74.

Description will be made with reference to FIG. 16, which illustrates the vertical slide 7A. As compared with the vertical slide 7, the vertical slide 7A includes the bearing 75 fixed to the center of the bridge 2 and the slide shaft 76 penetrating through the bearing 75 to be vertically movable. Specifically, the vertical slide 7A includes the vertical movable slide shaft 76, the bearing 75 fixed to the center of the bridge 2, the elastic members 73 attached to the slide shaft 76, and the stop ring 74 attached to the upper end of the slide shaft 76. While the slide shaft 76 is provided with two through holes pierced therethrough in the same manner as described above, the bearing 75 is provided with the single curved-concave groove 75a formed therein by cutting as described above, where the projection of the elastic members 73 is to be fitted. The nose pads 5 are fixed to the lower end of the slide shaft 76, accordingly.

A vertical movement unit 8 is provided to an outer periphery of each of the lens-holding frames 1 while being connected to the front end of the temple 4. The vertical movement unit 8 includes at least an L-shaped fixation plate 81 fixed to the outer periphery of each of the lens-holding frames 1, a pair of flat springs 82 penetrating through the fixation plate 81 so that the fixation plate 81 is vertically movable, a movable plate 83 located above the fixation plate 81 while fixed to respective first ends of the flat springs 82, and an antidrop member 84 fixed to respective second ends of the flat springs 82. The movable plate 83 is connected to the front end of the temple 4. A displacement of the vertical slide 7 and the vertical movement unit 8 preferably corresponds to a distance between respective centers of the lens A and the lens B, which are vertically arranged. The flat springs 82 are attached together as being curved as shown in FIGS. 17A to 17C and 18.

Figure 18:
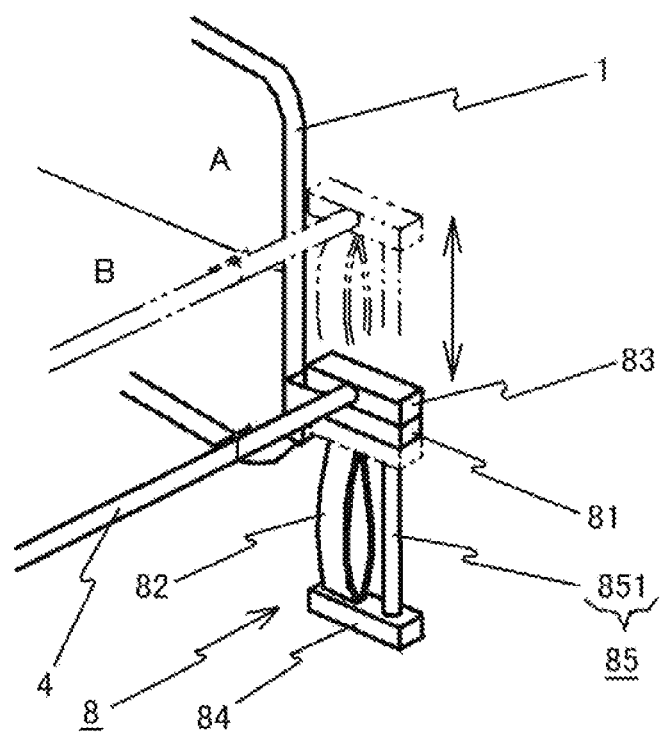
FIG. 18 illustrates relevant parts of the vertical movement unit and a guide mechanism.

FIGS. 18 and 19A to 19C illustrate the vertical movement unit 8 according to the second exemplary embodiment provided with a guide mechanism 85. The guide mechanism 85 will be described with reference to these figures. The guide mechanism 85 includes a guide bar 851. The fixation plate 81 has a part elongated outward (rightward in the figures) and provided with a hole, where the guide bar 851 is inserted. The movable plate 83 also has a similarly elongated part, where an upper end of the guide bar 851 is fixed. The antidrop member 84 also has a similarly elongated part, where a lower end of the guide bar 851 is fixed. At this time, the front end of the temple 4 is connected to a side surface of the movable plate 83 substantially at the center thereof as shown in FIG. 18. It should be noted the front end of the temple 4 may be slightly bent and fixed to the top of the movable plate 83 as shown in FIG. 11. In this case, the level of the attachment position of the fixation plate 81 is adjusted in advance so that the level of a rear end of the temple 4 becomes the same as the level of the center of the lens.

An operation of the vertical slide 7 will be described below with reference to FIG. 15. First, the slide bearing 72 in the state "a" is pushed upward in a direction of an arrow with a finger, thereby disengaging the projections of one of the elastic members 73 out of the hanging shaft 71 from the groove 72a of the slide bearing 72. The slide bearing 72 thus becomes smoothly movable with a space being formed between the slide bearing 72 and the hanging shaft 71 as in the state "b". The slide bearing 72 is then moved further upward. The projections of one of the elastic member 73 out of the hanging shaft 71 are then fitted into the groove 72a of the slide bearing 72, thereby stopping the slide bearing 72 at a position "c". The nose pads 5 are thus moved upward from the position "a" to the position "c". The nose pads 5 can be moved downward by pushing down the slide bearing 72 back to the position "a".

An operation of the vertical slide 7A will be described below with reference to FIG. 16. First, the nose pads 5 as in a state "a" are pushed down in a direction of an arrow with a finger, thereby disengaging the lower one of the elastic members 73 on the slide shaft 76 from the groove of the bearing 75. The bearing 75 thus becomes smoothly movable with a space being formed between the slide shaft 76 and the bearing 75, so that the slide shaft 76 naturally drops passing through a position "b" until the upper one of the elastic members 73 comes into contact with the bearing 75. By pulling the nose pads 5 with a slight force, the nose pads 5 are moved downward along with the slide shaft 76 to be held at a position "c" with the elastic member 73 being fitted into the groove of the bearing 75. The nose pads 5 are thus moved downward from the position "a" to the position "c". The nose pads 5 can be moved upward by pushing up the nose pads 5 back to the position "a".

Next, an operation of the vertical movement unit 8 will be described below with reference to FIGS. 17A to 17C. The movable plate 83 is first pushed upward with a finger, letting the two flat springs 82 through a rectangular hole 81a provided to the fixation plate 81 with a reduction in a width between the flat springs 82. When the movable plate 83 comes substantially halfway, the width between the two flat springs 82 is minimized as shown in FIG. 17B. As the movable plate 83 is then further pushed upward, the antidrop member 84 comes into contact with the fixation plate 81, stopping the movable plate 83 as shown in FIG. 17C. The flat springs 82, which have been let through the fixation plate 81, are later moved downward back to the original position, causing the movable plate 83 to come into contact with the fixation plate 81 to be stopped as shown in FIG. 17A. It should be noted that when the movable plate 83 reaches the position (c), a spring force acts outward and thus the movable plate 83 and the antidrop member 84 are kept from falling down.

Figure 19A:
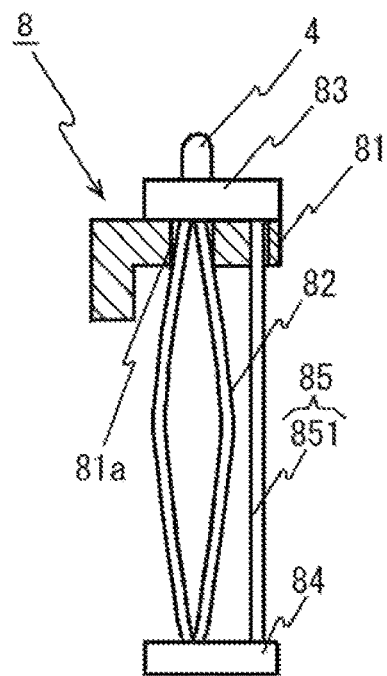
FIG. 19A illustrates an operation of the vertical movement unit and the guide mechanism.
Figure 19B:
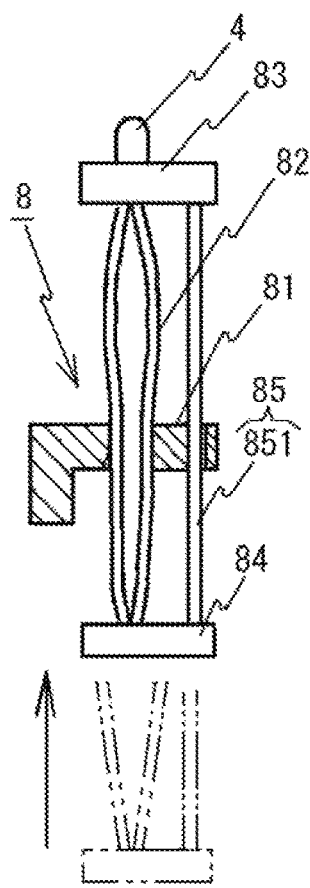
FIG. 19B illustrates the operation of the vertical movement unit and the guide mechanism.

FIGS. 19A to 19C illustrate an operation of the vertical movement unit 8 and the guide mechanism 85. The guide mechanism 85 is configured to operate in conjunction with the operation shown in FIGS. 17A to 17C. The movable plate 83 is first pushed upward with a finger, letting the two flat springs 82 through the rectangular hole 81a of the fixation plate 81 as described above. Simultaneously, the guide bar 851 of the guide mechanism 85 guides the movable plate 83 while reducing the twisting and/or shakiness of the flat springs 82 to achieve a smooth vertical movement of the movable plate 83. The width between the flat springs 82 can thus be smoothly reduced, allowing the movable plate 83 to pass through the substantial halfway as shown in FIG. 19B. As the movable plate 83 is then further pushed upward, the antidrop member 84 comes into contact with the fixation plate 81, stopping the movable plate 83 as shown in FIG. 19C. At this time, the guide bar 851 increases the stability of the movable plate 83. The flat springs 82, which have been let through the fixation plate 81, are later moved downward back to the original position, causing the movable plate 83 to come into contact with the fixation plate 81 to be stopped as shown in FIG. 19A. It should be noted that when the movable plate 83 reaches the position shown in FIG. 19C, the spring force acts outward and thus the movable plate 83 is kept from falling down.

Figure 20A:
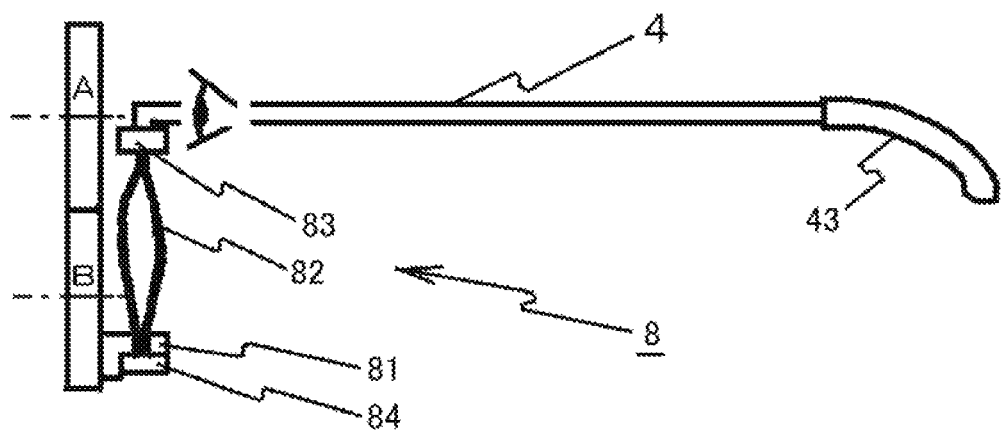
FIG. 20A illustrates an operation according to the second exemplary embodiment.
Figure 20B:
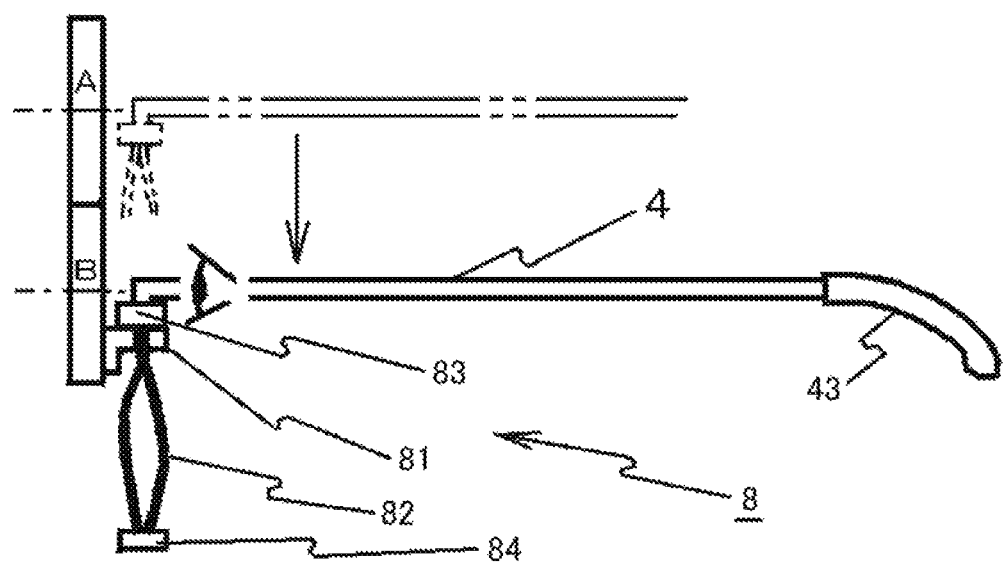
FIG. 20B illustrates the operation according to the second exemplary embodiment.

Operations and advantages in the second exemplary embodiment will be described below with reference to FIGS. 20A and 20B. Firstly, a state shown in FIG. 20A will be described. When the user wears glasses in the state shown in FIG. 20A, the eye level of the user is aligned with the center (a chain line in the figure) of the lens A, so that the user can see an object very clearly and upper and lower sides of the lens A are effectively usable. At this time, the nose pads 5 are in the state "c" shown in FIG. 15. In order to subsequently use the lens B, the user firstly pushes the movable plate 83 downward with a finger, letting the flat springs 82 through the rectangular hole 81a of the fixation plate 81 and bringing the movable plate 83 into contact with the fixation plate 81 to be stopped as shown in FIG. 20B. At this time, the nose pads 5 are in the state "a" shown in FIG. 15. The center (a chain line in the figure) of the lens B is aligned with the eye level in this state in the same manner as when the lens A is used. The user can thus look straight at the object, so that eyestrain of the user is drastically reducible.

Such a vertical movement of the movable plate 83 causes a relative vertical movement of the lens-holding frames 1. Since the nose pads 5 are vertically moved along with the vertical movement of the movable plate 83, the eye level can be shifted from the center of the lens A to the center of the lens B without changing the positional relationship of the nose pads 5, the ear pieces 43, and the temple 4 for the use of the lens A.

Besides the first exemplary embodiment, the second exemplary embodiment can also solve the conventional problems, providing the same effects as those of the first exemplary embodiment.

Third Exemplary Embodiment

Figure 21:
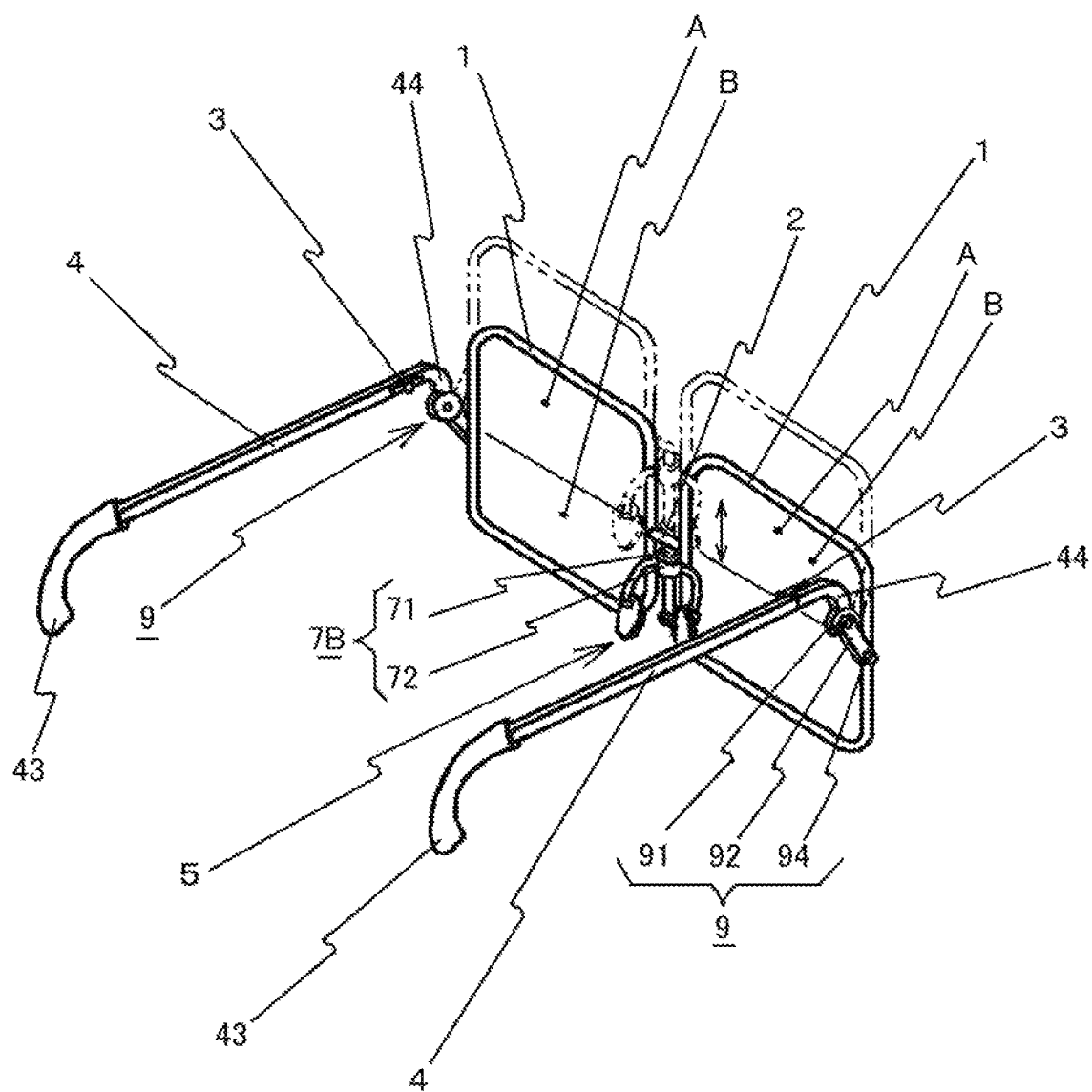
FIG. 21 illustrates a third exemplary embodiment of the invention.
Figure 22:
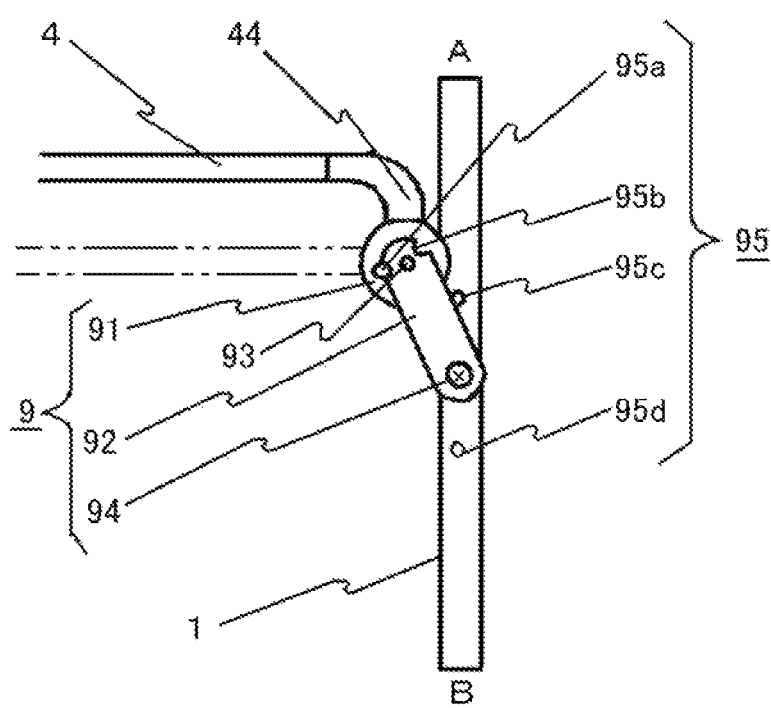
FIG. 22 illustrates a vertical movement unit.

A third exemplary embodiment of the invention will be described with reference to FIGS. 21 and 22.

The temple 4, which is hinged at the front end thereof, includes a bent portion 44 formed by bending the front end of the temple 4 downward. The temple 4 also includes an ear piece 43 at a rear end thereof. It should be noted that the bent portion 44 is not necessarily provided. For instance, the tip end of the temple 4 may be straight as shown by two-dot chain lines in FIG. 22.

Figure 24:
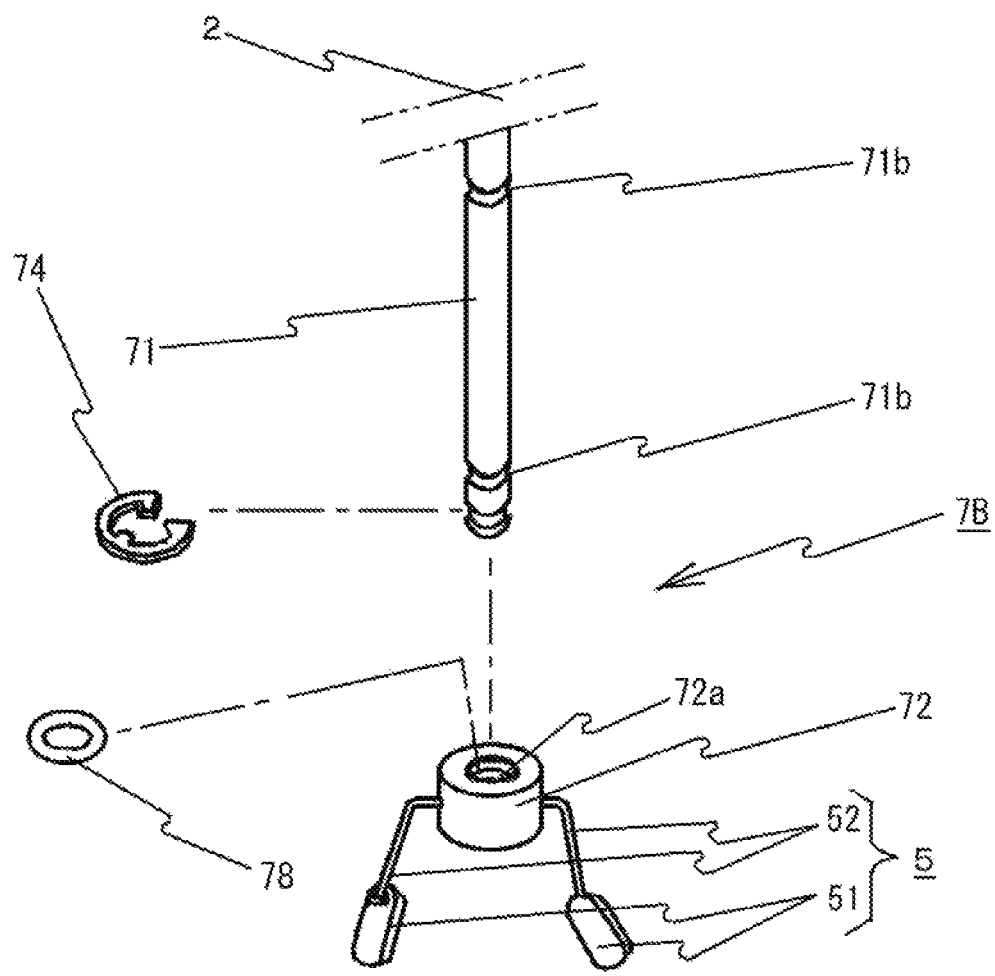
FIG. 24 illustrates a nose pad elevation unit.

The nose pads 5 each include at least a pad 51 and a support bar 52 (see FIG. 24). An end of the support bar 52 is fixed to the later-described slide bearing 72.

A vertical movement unit 9 is configured to vertically move the lens-holding frames 1. The vertical movement unit 9 includes at least a disc-shaped bearing 91 fixed to a front end of the bent portion 44 of the temple 4, a plate-shaped operation arm 92 with a first end that is pivotally connected to the bearing 91 via a shaft 93, an attachment shaft 94 that pivotally connects a second end of the operation arm 92 to the outer periphery of each of the lens-holding frames 1 at a center level thereof, and a position retainer 95 configured to hold the operation arm 92 at a predetermined position (see FIG. 22). The shaft 93 may be a pin and the attachment shaft 94 may be a pin or a headed screw. The position retainer 95 includes a protrusion 95a provided to the bearing 91, first and second cuts 95b that are provided to an edge of the operation arm 92 and engageable with the protrusion 95a, and uppermost stop 95c and lowermost stop 95d that are, for instance, pins provided upright to the periphery of each of the lens-holding frames 1. The protrusion 95a is semispherical. It should be noted that the vertical movement unit 9 may have a structure different from the above as long as the vertical movement unit 9 includes the operation arm 92. The position retainer 95 may also have a structure different from the above.

A nose pad elevation unit 7B is configured to vertically move the nose pads 5. The nose pad elevation unit 7B includes at least a hanging shaft 71 in the form of a round bar that hangs on the center of the bridge 2, a slide bearing 72 that receives the hanging shaft 71 to be vertically movable, an elastic member 78 attached inside the slide bearing 72, and a stop ring 74 attached to an end of the hanging shaft 71 (see FIG. 24). The hanging shaft 71 is provided with two curved-concave grooves 71b where the elastic member 78 is to be received for positioning. The two grooves 71b are spaced from each other at a distance equal to a vertical displacement of the lens-holding frames 1. The elastic member 78 is preferably an O-ring but may be any other elastic member. The stop ring 74 is preferably an E-ring but may be any other component capable of preventing the slide bearing 72 from falling off the hanging shaft 71. For instance, the stop ring 74 may be a C-ring or a headed stop screw. It should be noted that the nose pad elevation unit 7B may have the same structure as the vertical movement unit 9 including the operation arm. In some exemplary embodiments, the nose pad elevation unit 7B has another structure (not shown), including a fixation plate provided in place of the bridge 2, a movable plate facing the fixation plate, and a pair of flat springs that are fixed to the fixation plate at respective first ends thereof and to the antidrop member at respective second ends thereof while being bent outward at the center thereof, the flat springs being inserted through a hole provided to the movable plate so that the movable plate (corresponding to the bearing) can be vertically moved between the fixation plate and the antidrop member.

Figure 23A:
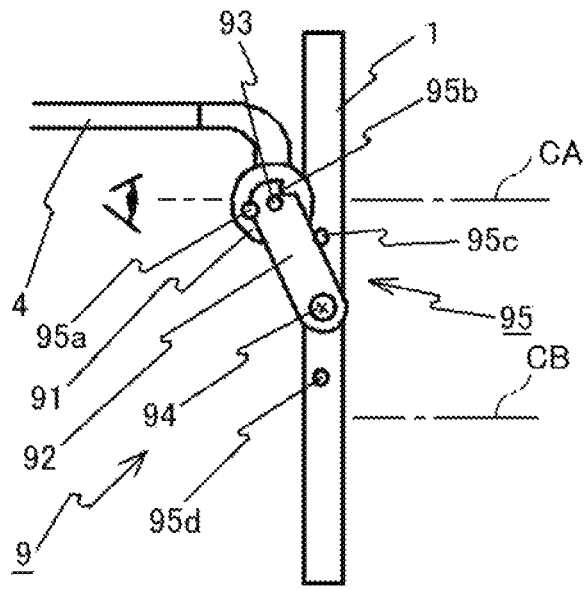
FIG. 23A illustrates an operation of the vertical movement unit.
Figure 23B:
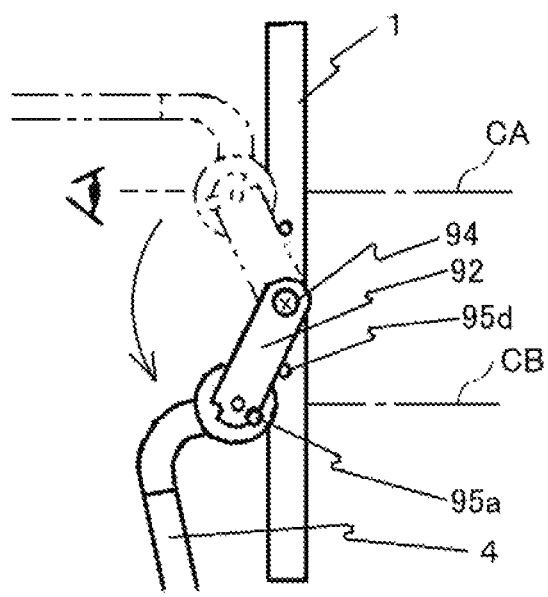
FIG. 23B illustrates the operation of the vertical movement unit.
Figure 23C:
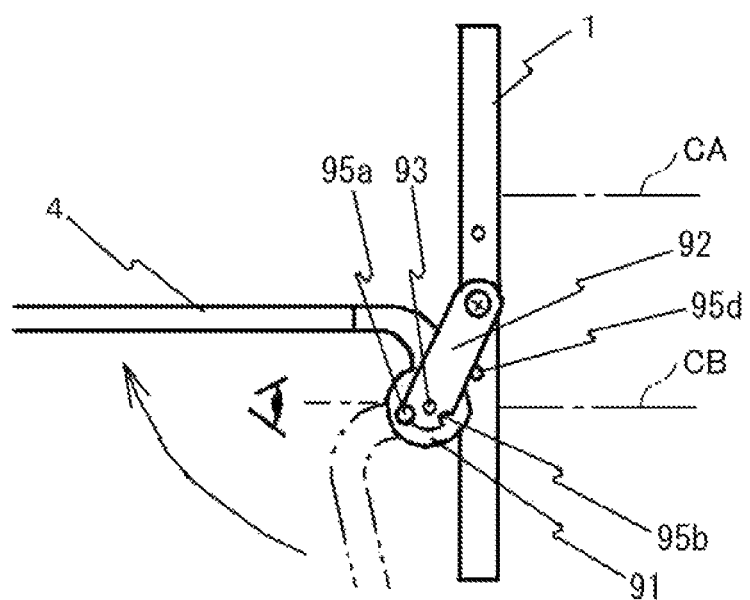
FIG. 23C illustrates the operation of the vertical movement unit.

An operation of the vertical movement unit 9 will be described below with reference to FIGS. 23A to 23C. First, a state shown in FIG. 23A is explained. When the user wears the glasses in this state, the eye level of the user is aligned with a center CA of the lens A. Thus, the user can see an object very clearly and upper and lower sides of the lens A are effectively usable In order to subsequently use the lens B, each of the lens-holding frames 1 is first held with one hand so as not to be moved, while the temple 4 is held with the other hand to push the operation arm 92 downward. The operation arm 92 is thus rotated around the attachment shaft 94 as shown by the arrow in the figure to reach a position shown in FIG. 23B. At this time, the temple 4 is directed downward, so that the temple 4 needs to be set horizontal. In order to set the temple 4 horizontal, each of the lens-holding frames 1 is held with the one hand along with the operation arm 92 so as not to be moved. The temple 4 is then rotated around the shaft 93 so that the temple 4 is set horizontal. Simultaneously, the end of the operation arm 92 is slightly raised, so that the protrusion 95a is retracted from the first cut 95b. The protrusion 95a of the bearing 91 is thus disengaged. Subsequently, a further rotation of the temple 4 with the protrusion 95a being retracted from the operation arm 92 causes the protrusion 95a to project from the second cut 95b, thereby maintaining an engaged state as shown in FIG. 23C. It should be noted that the above operation may be achieved by fixing the temple 4 and lifting each of the lens-holding frames 1 upward. In this case, the nose pads 5 are also lifted upward together, so that the eye level can be aligned with a center CB of the lens B in the same manner as when the lens A is used by pushing the slide bearing 72 downward with a finger to lower the nose pads 5. Thus, the user can look straight at the object, so that eyestrain of the user is drastically reducible. A rotative force of the operation arm 92 near the attachment shaft 94 is preferably adjusted in advance to be at least enough to hold each of the lens-holding frames 1 so that the user can put on the glasses without rotating the lens-holding frame(s) 1.

Figure 25:
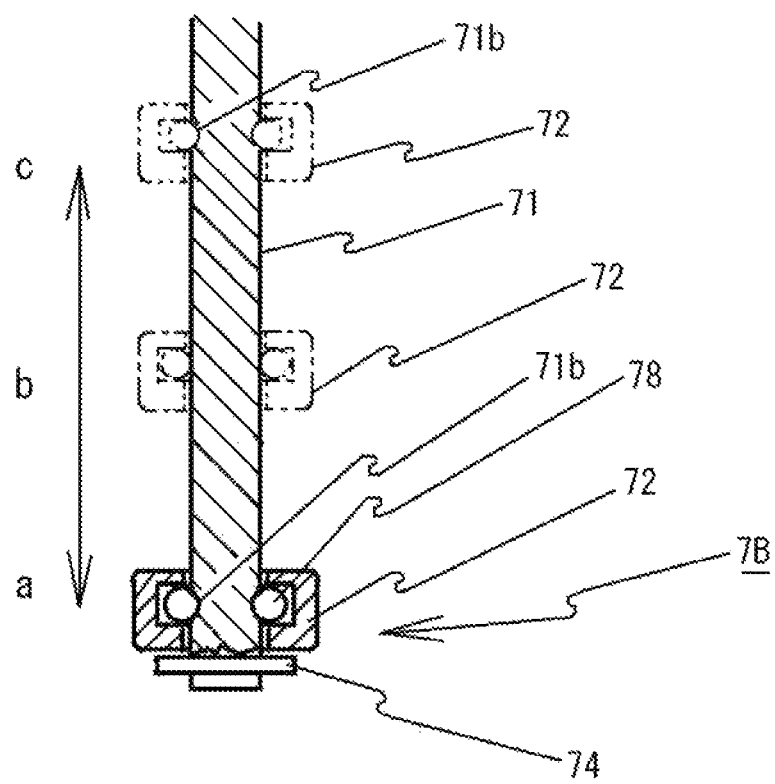
FIG. 25 illustrates an operation of the nose pad elevation unit.
Figure 26A:
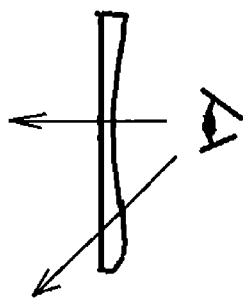
FIG. 26A illustrates eye directions through a conventional pair of glasses.
Figure 26B:
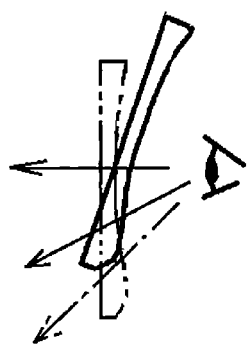
FIG. 26B illustrates eye directions through another conventional pair of glasses.
Figure 26C:
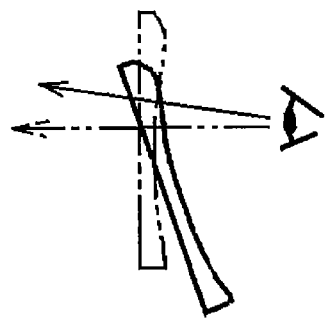
FIG. 26C illustrates eye directions through still another conventional pair of glasses.

An operation of the nose pad elevation unit 7B will be described below with reference to FIG. 25. First, the slide bearing 72 in a state "a" is pushed upward in a direction of an arrow with a finger, thereby disengaging the elastic member 78 in the form of an O-ring from the groove 71b. An inner diameter of the elastic member 78 thus becomes as large as an outer diameter of the hanging shaft 71.

Simultaneously, the elastic member 78 is forced deeper into the groove 72a of the slide bearing 72 as in a state "b". As the slide bearing 72 in this state is further moved upward, the elastic member 78 is fitted into the groove 71b, stopping the slide bearing 72 at a position "c". The nose pads 5 are thus moved upward from the position "a" to the position "c". It should be noted that the nose pads 5 are set at the position "c" for the use of the lens A to see and set at the position "a" for the use of the lens B to see.

Next, description will be made on how to use the glasses according to the third exemplary embodiment. First, for the use of the lens A, the temple 4 is set in the state shown in FIG. 23A and the nose pads 5 are set at the position "c" shown in FIG. 25 to be above the hanging shaft 71. Meanwhile, for the use of the lens B, the temple 4 is set in the state shown in FIG. 23C and the nose pads 5 are lowered to the position "a" shown in FIG. 25 to be below the hanging shaft 71. Such vertical movement of the temple 4 and the nose pads 5 allows for switching the two different types of lenses depending on the intended use. Further, the glasses according to the third exemplary embodiment is different from conventional glasses in that the eye level can be changed from the center CA of the lens A to the center CB of the lens B without changing the positional relationship for the use of the lens A, i.e., the positional relationship of the nose pads 5, the temple 4, and the ear pieces 43.

Besides the first and second exemplary embodiments, the third exemplary embodiment can also solve the conventional problems, providing the same effects as those of the first and second exemplary embodiments.

The invention claimed is:

1. A bifocal-glasses frame comprising:
a pair of lens-holding frames each holding lenses that are vertically arranged;
a bridge coupling the pair of lens-holding frames;
a temple hinged, at a front end thereof, to an outer periphery of each of the lens-holding frames;
nose pads being brought into contact with a nose for support;
a vertical movement unit configured to vertically move the lens-holding frames along a front vertically bent portion of the temple; and
a vertical slide provided to the bridge, the vertical slide being configured to vertically slide the nose pads.

2. The bifocal-glasses frame according to claim 1, wherein the bent portion of the temple is configured to align a center of one or the other of the lenses that are vertically arranged with a level of a rear portion of the temple.

3. The bifocal-glasses frame according to claim 1, wherein the vertical movement unit comprises:
a bearing fixed to a front end of the temple;
an elastic member attached inside the bearing; and
a stop ring attached to a vertical portion of the temple.

4. The bifocal-glasses frame according to claim 1, wherein the vertical slide comprises:
a hanging shaft hanging on a center of the bridge;
a slide bearing through which the hanging shaft penetrates;
an elastic member attached inside the slide bearing; and
a stop ring attached to an end of the hanging shaft.

5. A bifocal-glasses frame comprising:
a pair of lens-holding frames each holding lenses that are vertically arranged;
a bridge coupling the pair of lens-holding frames;
a temple with a hinged front end;
nose pads being brought into contact with a nose for support;
a vertical slide provided to the bridge, the vertical slide being configured to vertically slide the nose pads; and
a vertical movement unit provided to an outer periphery of each of the lens-holding frames while being connected to a front end of the temple to vertically move each of the lens-holding frames, wherein
the vertical movement unit comprises:
a fixation plate fixed to the outer periphery of each of the lens-holding frames;
a pair of flat springs that penetrate through the fixation plate so that the fixation plate is vertically movable;
a movable plate located above the fixation plate and fixed to respective first ends of the flat springs; and
an antidrop member fixed to respective second ends of the flat springs, and
the movable plate is connected to the front end of the temple.

6. The bifocal-glasses frame according to claim 5, wherein a displacement of the vertical slide and the vertical movement unit corresponds to a distance between respective centers of the lenses that are vertically arranged.

7. The bifocal-glasses frame according to claim 5, wherein the vertical slide comprises:
a shaft hanging on a center of the bridge;
a bearing through which the shaft penetrates;
an elastic member attached to the shaft; and
a stop ring attached to an end of the shaft.

8. The bifocal-glasses frame according to claim 5, wherein the vertical slide comprises:
a bearing fixed to a center of the bridge;
a shaft penetrating through the bearing;
an elastic member attached to the shaft; and
a stop ring attached to an end of the shaft.

9. The bifocal-glasses frame according to claim 5, wherein
the vertical movement unit further comprises a guide mechanism for vertical movement,
the guide mechanism comprises the fixation plate with an end provided with a hole, and a guide bar with a first end fixed to the movable plate and a second end fixed to the antidrop member, and
the movable plate is configured to be vertically movable with the guide bar being received in the hole of the fixation plate.

10. A bifocal-glasses frame comprising:
a pair of lens-holding frames each holding lenses that are vertically arranged;
a bridge coupling the pair of lens-holding frames;
a hinged temple;
nose pads being brought into contact with a nose for support;
a vertical movement unit configured to vertically move the lens-holding frames; and
a nose pad elevation unit configured to vertically move the nose pads, wherein the vertical movement unit comprises:
a bearing fixed to a front end of the temple;
an operation arm having a first end that is pivotally connected to the bearing via a shaft;
an attachment shaft configured to pivotally connect a second end of the operation arm to an outer periphery of each of the lens-holding frames and a center in height of each of the lens-holding frames; and
a position retainer configured to retain the operation arm at a predetermined position,
wherein the vertical movement unit is configured to change an eye level from a center of a first one of the vertically arranged lenses to a center of a second one of the vertically arranged lenses by vertically moving the pair of lens-holding frames and the nose pads.

11. The bifocal-glasses frame according to claim 10, wherein the position retainer comprises:
   a protrusion provided to the bearing; and
   a cut provided to an edge of the operation arm and engageable with the protrusion.

12. The bifocal-glasses frame according to claim 10, wherein the nose pad elevation unit comprises:
   a hanging shaft hanging on a center of the bridge;
   a bearing receiving the hanging shaft to be vertically movable;
   an elastic member attached inside the bearing; and
   a stop ring attached to an end of the hanging shaft.

* * * * *